(12) United States Patent
Tanemura et al.

(10) Patent No.: US 11,199,458 B2
(45) Date of Patent: Dec. 14, 2021

(54) FORCE SENSING INPUT DEVICE UTILIZING STRAIN GAUGES

(71) Applicant: SYNAPTICS INCORPORATED, San Jose, CA (US)

(72) Inventors: Tetsuo Tanemura, Tokyo (JP); David Sobel, Los Altos, CA (US)

(73) Assignee: Synaptics Incorporated, San Jose, CA (US)

( * ) Notice: Subject to any disclaimer, the term of this patent is extended or adjusted under 35 U.S.C. 154(b) by 68 days.

(21) Appl. No.: 16/805,413

(22) Filed: Feb. 28, 2020

(65) Prior Publication Data

US 2021/0096034 A1    Apr. 1, 2021

Related U.S. Application Data

(60) Provisional application No. 62/939,363, filed on Nov. 22, 2019, provisional application No. 62/907,065, filed on Sep. 27, 2019.

(51) Int. Cl.

| | |
|---|---|
| *G01L 1/00* | (2006.01) |
| *G01L 1/22* | (2006.01) |
| *G06F 3/044* | (2006.01) |
| *G06F 3/041* | (2006.01) |

(52) U.S. Cl.
CPC .......... *G01L 1/2287* (2013.01); *G06F 3/0414* (2013.01); *G06F 3/0448* (2019.05)

(58) Field of Classification Search
CPC ..... G01L 1/2287; G06F 3/0448; G06F 3/0414
See application file for complete search history.

(56) References Cited

U.S. PATENT DOCUMENTS

| | | | | |
|---|---|---|---|---|
| 3,899,924 A | * | 8/1975 | Klein | G01G 3/1402 73/862.628 |
| 6,243,077 B1 | * | 6/2001 | Manara | G06F 3/0213 345/157 |
| 10,296,148 B2 | | 5/2019 | Tanemura et al. | |
| 10,309,846 B2 | * | 6/2019 | Smith | G06F 3/0418 |
| 10,809,830 B2 | * | 10/2020 | Kim | G01L 1/2281 |
| 2011/0193809 A1 | * | 8/2011 | Walley | G06F 3/0446 345/173 |
| 2016/0041672 A1 | | 2/2016 | Hoen et al. | |
| 2017/0277296 A1 | * | 9/2017 | Reynolds | G06F 3/044 |
| 2018/0059820 A1 | * | 3/2018 | Tanemura | G06F 3/0445 |

* cited by examiner

*Primary Examiner* — Max H Noori
(74) *Attorney, Agent, or Firm* — Leydig, Voit & Mayer, Ltd.

(57) ABSTRACT

A force sensing device includes a first force sensor and a second force sensor. The first force sensor is configured to output a first force resulting signal and includes a first strain gauge coupled to a first voltage source and a first trace. The first force sensor further includes a second strain gauge coupled to a second voltage source and the first trace. The second force sensor is configured to output a second force resulting signal having a polarity opposite that of the first force resulting signal. The second force sensor includes a first strain gauge coupled to the second voltage source and a second trace, and a second strain gauge coupled to the first voltage source and the second trace.

20 Claims, 12 Drawing Sheets

FORCE SENSING INPUT DEVICE UTILIZING STRAIN GAUGES

CROSS-REFERENCE TO RELATED APPLICATIONS

This application claims priority to U.S. provisional patent application Ser. No. 62/907,065, filed Sep. 27, 2019, and U.S. provisional patent application Ser. No. 62/939,363, filed Nov. 22, 2019, both of which are incorporated by reference herein in their entirety.

BACKGROUND

Field

The disclosure herein is generally related to electronic devices, and more specifically, to sensing force in input devices.

Description of the Related Art

Input devices including input sensing devices may be used in a variety of electronic systems. An input sensing device may include a sensing region, demarked by a surface, in which the proximity sensor device determines the presence, location, force and/or motion of one or more input objects. Input sensing devices may be used to provide interfaces for the electronic system. For example, input sensing devices may be used as input devices for larger computing systems, such as touchpads or touch screens integrated in, or peripheral to, notebook, desktop computers, or multimedia centers of automobiles. Input sensing devices may also often be used in smaller computing systems, such as touch screens integrated in cellular phones. Further, input sensing devices may be used as input devices in internet of things (IoT) devices.

SUMMARY

In one embodiment, a force sensing device comprises a first force sensor and a second force sensor. The first force sensor is configured to output a first force resulting signal. Further, the first force sensor comprises a first strain gauge having a first end coupled to a first voltage source configured to provide a first voltage and a second end coupled to a first trace. The first force sensor further comprises a second strain gauge having a first end coupled to a second voltage source configured to provide a second voltage and a second end coupled to the first trace. The second voltage differs from the first voltage. The second force sensor is configured to output a second force resulting signal. The second force sensor comprises a first strain gauge having a first end coupled to the second voltage source and a second end coupled to a second trace. The second force sensor further comprises a second strain gauge having a first end coupled to the first voltage source and a second end coupled to the second trace. The polarity of the first force resulting signal is opposite a polarity of the second force resulting signal.

In one embodiment, a processing system of an input device comprises a sensor driver and a determination module. The sensor driver is coupled to a first force sensor and a second force sensor via a first trace and second trace, respectively. The sensor driver is configured to receive a first force resulting signal from the first force sensor and a second force resulting signal from the second force sensor. The polarity of the first force resulting signal is opposite a polarity of the second force resulting signal. The first force sensor comprises a first strain gauge having a first end coupled to a first voltage source configured to provide a first voltage and a second end coupled to the first trace. The first force sensor further comprises a second strain gauge having a first end coupled to a second voltage source configured to provide a second voltage and a second end coupled to the first trace. The first voltage differs from the second voltage. The second force sensor comprises a first strain gauge having a first end coupled to the second voltage source and a second end coupled to the second trace. The second force sensor further comprises a second strain gauge having a first end coupled to the first voltage source and a second end coupled to the second trace. The determination module is configured to determine force information for an input object based on the first and second force resulting signals.

In one embodiment, an input device comprises an active area defined by a plurality of sensor electrodes, a first force sensor, a second force sensor, and a processing system. The first force sensor is disposed between a first edge of the input device and the active area. The first force sensor comprises a first strain gauge having a first end coupled to a first voltage source configured to provide a first voltage and a second end coupled to a first trace. The first force sensor further comprises a second strain gauge having a first end coupled to a second voltage source configured to provide a second voltage and a second end coupled to the first trace. The second voltage differs from the first voltage. The second force sensor is disposed between the first edge of the input device and the active area. The second force sensor comprises a first strain gauge having a first end coupled to the second voltage source and a second end coupled to a second trace. The second force sensor further comprises a second strain gauge having a first end coupled to the first voltage source and a second end coupled to the second trace. The processing system is coupled to the first force sensor and the second force sensor via the first trace and second trace, respectively. The processing system is configured to receive a first force resulting signal from the first force sensor and a second force resulting signal from the second force sensor and determine force information for an input object based at least in part of the first force resulting signal and the second force resulting signal. The polarity of the first force resulting signal is opposite a polarity of the second force resulting signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1A:
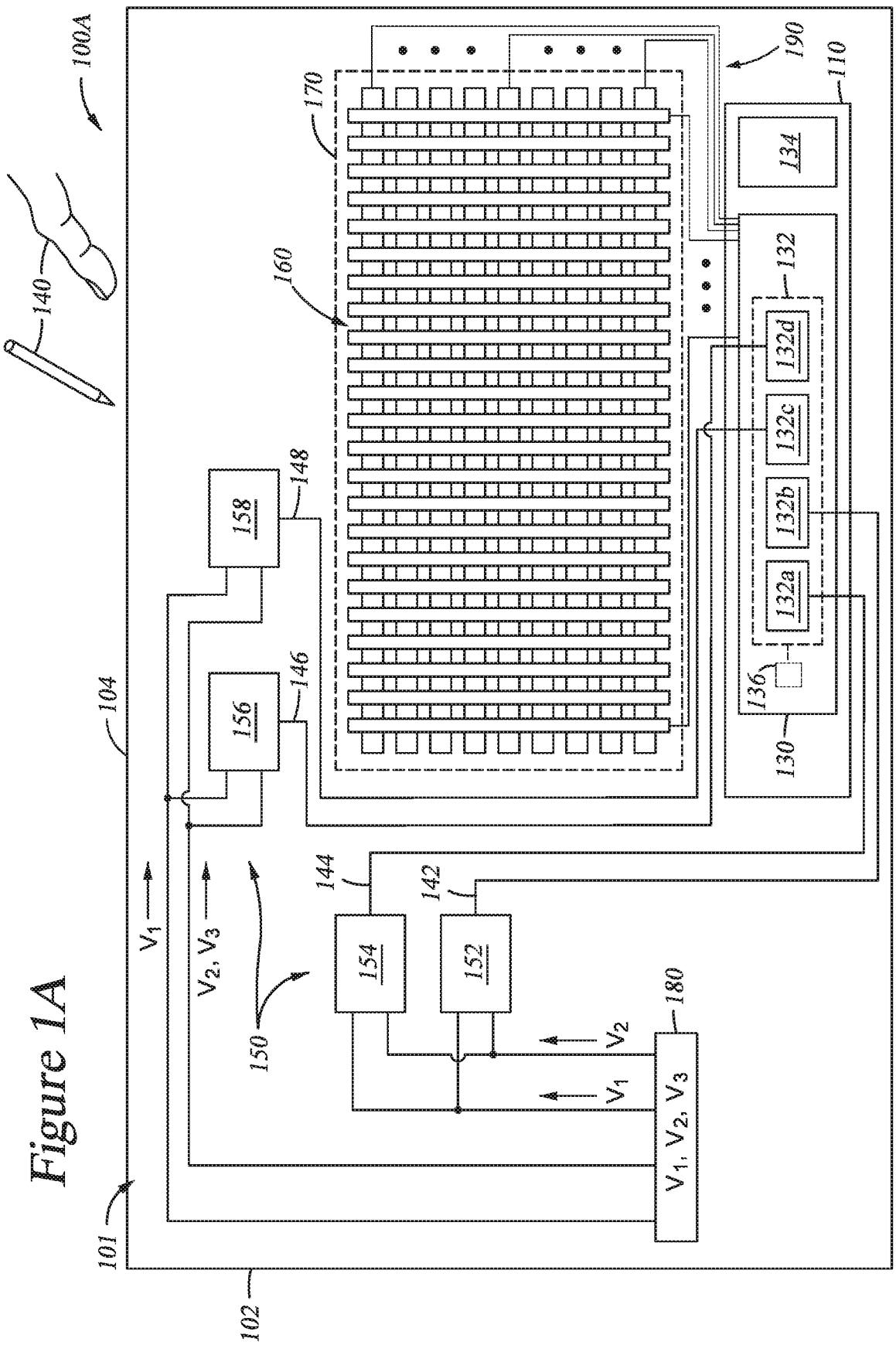
FIG. 1A is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Strain gauges may be used within input devices to detect input forces. In the following disclosure various configurations of strain gauges are discussed which provide increased coverage and reduced receiver channel utilization as compared to conventional designs. For example, each force sensor may be implemented as a half-bridge node including two or more strain gauges. Such force sensors advantageously provide higher spatial density, while also providing common mode noise mitigation. Further, force sensors having different polarities may be utilized to provide a higher magnitude force response.

FIG. 1A illustrates an example input device 100A according to one or more embodiments. In various embodiments, the input device 100A may be configured to provide input to an electronic system (not shown). An electronic system broadly refers to any system capable of electronically processing information. Some non-limiting examples of electronic systems include personal computers of all sizes and shapes, such as desktop computers, laptop computers, tablets, web browsers, e-book readers, and personal digital assistants (PDAs). Additional example electronic systems include multimedia centers for automobiles. Further example electronic systems internet of things (IoT) devices. The electronic system may also be referred to as an electronic device.

The input device 100A can be implemented as a physical part of the electronic system, or can be physically separate from the electronic system. As appropriate, the input device 100A may communicate with parts of the electronic system using any one or more wired or wireless interconnections.

In FIG. 1A, the input device 100A is a proximity sensing device and a force sensing device configured to sense input provided by one or more input objects 140 in a sensing region of the input device 100A. Example input objects 140 include fingers and styli, among other. In various embodiments, the input device 100A may be configured as a touchpad, a touch screen, or a touch sensor device, among others.

The sensing region encompasses any space above, around, in and/or near the input device 100A in which the input device 100A is able to detect user input, e.g., user input provided by one or more input objects 140. The sizes, shapes, and locations of particular sensing regions may vary widely from embodiment to embodiment. In some embodiments, the sensing region extends from a surface of the input device 100A in one or more directions into space until signal-to-noise ratios prevent sufficiently accurate object detection. The distance to which the sensing region extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100A; contact with an input surface, e.g., a touch surface, of the input device 100A, contact with an input surface of the input device 100A coupled with some amount of applied force or pressure; and/or a combination thereof.

The input device 100A may utilize different combinations of sensor components and sensing technologies to detect user input in the sensing region. In one example, the input device 100A comprises sensor electrodes 160 and force sensors 150 for detecting user input. As will be discussed in the following in greater detail, the sensor electrodes 160 may be operated to detect changes in capacitance due to the input object 140 and the force sensors 150 may be operated to detect changes in resistance due to the input object 140. In one embodiment, the input device 100A does not include the sensor electrodes 160. In such embodiments, the input device 100A may utilize the force sensors 150 to determine both positional information and force information.

In FIG. 1A, a processing system 110 is shown as part of the input device 100A. The processing system 110 is configured to operate the sensor electrodes 160 and the force sensors 152-158 for input sensing.

The processing system 110 comprises parts of or all of one or more integrated circuit (IC) chips and/or other circuitry components. The processing system 110 may be configured to operate the sensor electrodes 160 for transcapacitive sensing and/or absolute capacitive sensing. Further, the processing system 110 may be configured to operate the force sensors 150 for force sensing.

The processing system 110 includes a sensor driver 130 and a determination module 134. The sensor driver 130 and the determination module 134 may comprise circuitry that operates the sensor electrodes 160 for capacitive sensing and/or the force sensors 150 for force sensing.

In one embodiment, the sensor driver 130 is coupled to the sensor electrodes 160 and is configured to operate the sensor electrodes 160 for absolute capacitive sensing. The sensor driver 130 is coupled to the sensor electrodes 160 via the traces 190. Operating the sensor electrodes 160 for absolute capacitive sensing (self-capacitive sensing) comprises driving one or more the sensor electrodes 160 with an absolute capacitive sensing signal to acquire resulting signals with the sensor electrodes 160 to determine changes in the capacitive coupling between the driven sensor electrodes and an input object (e.g., between a system ground and freespace coupling to the user). In various embodiments, an input object near the sensor electrodes alters the electric field near the driven sensor electrodes, thus changing the measured capacitive coupling. In one implementation, the sensor driver 130 drives one or more of the sensor electrodes 160 with absolute capacitive sensing signals to modulate the one or more sensor electrodes 160 with respect to a reference voltage, e.g., system ground, to detect the capacitive coupling between the driven sensor electrodes and input objects. The absolute capacitive sensing signals are modulated signals that vary between two or more voltages. Further, the absolute capacitive sensing signal may comprise a square waveform, sinusoidal waveform, triangular waveform, trapezoidal waveform, or sawtooth waveform, among others. Additionally, the absolute capacitive sensing signal may be periodic or aperiodic.

Additionally, or alternatively, the sensor driver 130 is configured to operate the sensor electrodes 160 for transcapacitive sensing. Operating the sensor electrodes 160 for transcapacitive sensing (e.g., mutual capacitive sensing) comprises driving a first one or more of the sensor electrodes 160 with a transcapacitive sensing signal or signals, and receiving resulting signals with a second one or more the sensor electrodes 160 to determine changes in the capacitive coupling between sensor electrodes 160. In various embodiments, an input object near the sensor electrodes 160 alters the electric field between the sensor electrodes 160 operated for transcapacitive sensing, thus changing the measured transcapacitive coupling. The first one or more sensor electrodes are modulated relative to the second one or more sensor electrodes. The transcapacitive sensing signals are modulated signals that vary between two or more voltages. Further, the transcapacitive sensing signal may comprise a square waveform, sinusoidal waveform, triangular waveform, trapezoidal waveform, or sawtooth waveform, among others. Additionally, the transcapacitive sensing signal may be periodic or aperiodic. The second one or more sensor electrodes may be driven with a substantially constant signal or a varying voltage signal.

The sensor electrodes 160 are formed of a conductive material. In various embodiments, the sensor electrodes 160 may be formed from indium tin oxide (ITO) or a substantially transparent metal mesh. One or more of the sensor electrodes 160 may be disposed on a first layer and second one or more of the sensor electrodes 160 may be disposed on second layer. The first and second layers may be different sides of a common substrate or layers on different substrates. In another embodiment, the sensor electrodes 160 may be disposed in a common layer. Further, the sensor electrodes 160 may each be a similar shape and/or size. Alternatively, one or more of the sensor electrodes 160 may be larger than another one of the sensor electrodes 160. Additionally, or alternatively, one or more of the sensor electrodes 160 may have a first shape and one or more of the sensor electrodes 160 may have a second shape different than the first shape.

Further, the sensor electrodes 160 may be disposed over a display of a display device. The display device may be part of the input device 100A or separate from the input device 100A. The sensor electrodes 160 may be formed on a common substrate of the display device (e.g., on the encapsulation layer of a rigid or flexible organic light emitting diode (OLED) display). Alternatively, one or more of the sensor electrodes 160 may comprise one or more display electrodes. For example, one or more of the sensor electrodes 160 may comprise one or more common electrodes used for display updating and input sensing.

The sensor electrodes 160 form the active area 170. The active area 170 may correspond to a sensing region and/or a display area of a display device of the input device 100A. For example, the active area 170 may correspond to a portion of a display of a device where an image is updated. In such an embodiment, the active area 170 may include one or more display electrodes configured to be driven with display signals to update an image displayed in the active area. Further, the display device may be one of a liquid crystal device (LCD) device or an OLED display device, among others.

The force sensors 152-158 are coupled to the processing system 110 via traces 142-148 and are configured to generate force resulting signals. For example, the force sensors 152-158 are coupled to the sensor driver 130 via respective traces 142-148. The various embodiments of the force sensors 152-158 are be described in greater detail with regard to FIGS. 1C-1D and 2-7.

The force sensors 152-158 are additionally coupled to one or more voltage sources 180 configured to provide the voltages $V_1$, $V_2$, and/or $V_3$. The one or more voltage sources 180 may be electronic devices configured to provide a fixed, or constant, voltage. In various embodiments, the one or more voltage sources 180 correspond to one or more voltage rails of the processing system 110. In various embodiments, the one or more voltage sources 180 include two or more voltage sources. In one embodiment, a first one of the one or more voltages sources 180 provides voltage $V_1$, a second one of the one or more voltages sources 180 provides voltage $V_2$, and a third one of the one or more voltages sources 180 provides voltage $V_3$. Further, the one or more voltage sources 180 may be disposed on the substrate 101. Alternatively, the one or more voltage sources 180 are external to the substrate 101.

The force sensors 152-154 and 156-158 may be driven with the same voltages by the one or more voltage sources 180. For example, the force sensors 152-154 and 156-158 may be driven with $V_1$ and $V_2$ by the one or more voltage sources 180. In another embodiment, the force sensors 152-154 are driven with at least one different voltage than the force sensors 156-158. For example, the force sensors 152-154 may be driven with $V_1$ and $V_2$ by the one or more voltage sources 180, and the force sensors 156-158 are driven with $V_1$ and $V_3$ by the one or more voltage sources 180. Alternatively, the force sensors 152-154 may be driven with $V_1$ and $V_2$ by the one or more voltage sources 180, and the force sensors 156-158 are driven with $V_2$ and $V_3$ by the one or more voltage sources 180. In other embodiments, the force sensors 152-154 are driven with a first two voltages and the force sensors 156-158 are driven with a second two voltages that are different than the first two voltages.

$V_1$, $V_2$, and $V_3$ are direct current (DC) voltages. In one embodiment, $V_1$ is a ground voltage of the input device 100A. Alternatively, $V_1$ is a DC voltage other than ground of the input device 100A. $V_2$ is a DC voltage that differs from $V_1$. Further, $V_2$ is a positive or negative voltage having a magnitude greater than that of $V_1$. For example, $V_2$ may be in a range of about 0V to about 10V or in a range of about 0V to about −10V. However, other voltages may be utilized. $V_3$ is a positive or negative voltage having a magnitude greater than that of $V_1$. For example, $V_3$ may be in a range of about 0V to about 10V or in a range of about 0V to about −10V. However, voltages greater than 10V and less than −10V may be utilized. In one embodiment, the polarity of $V_3$ is opposite the polarity of $V_2$. For example, the polarity of $V_3$ is negative and the polarity of $V_2$ is positive. Alternatively, the polarity of $V_3$ is positive and the polarity of $V_2$ is negative. In one or more embodiments, $V_1$, $V_2$, and/or $V_3$ may be voltages utilized by another element within the input device 100A. For example, one or more of the voltage $V_1$, $V_2$, and $V_3$ may be voltages utilized by a capacitive sensing device and/or a display device of the input device 100A.

The force resulting signals comprise information corresponding to an amount of force applied an input surface of the input device 100A (e.g., the input surface 172 of FIG. 1E) by one or more input objects (e.g., input object 140). For example, the force resulting signals may be indicative a change of force for the strain gauges of each force sensor. In one or more embodiments, the force sensing signals are current signals. In other embodiments, the force sensing signals are voltage signals.

Each of the force sensors 152-158 is formed from a half-bridge strain gauge (or half-bridge). For example, each of the force sensors 152-158 comprises at least two strain gauges. Adjacent pairs of the force sensors 152-158 may be connected in opposite polarities. For example, the polarity of the force sensor 152 is opposite that of the force sensor 154, and the polarity of the force sensor 156 is opposite that of the force sensor 158.

Figure 1B:
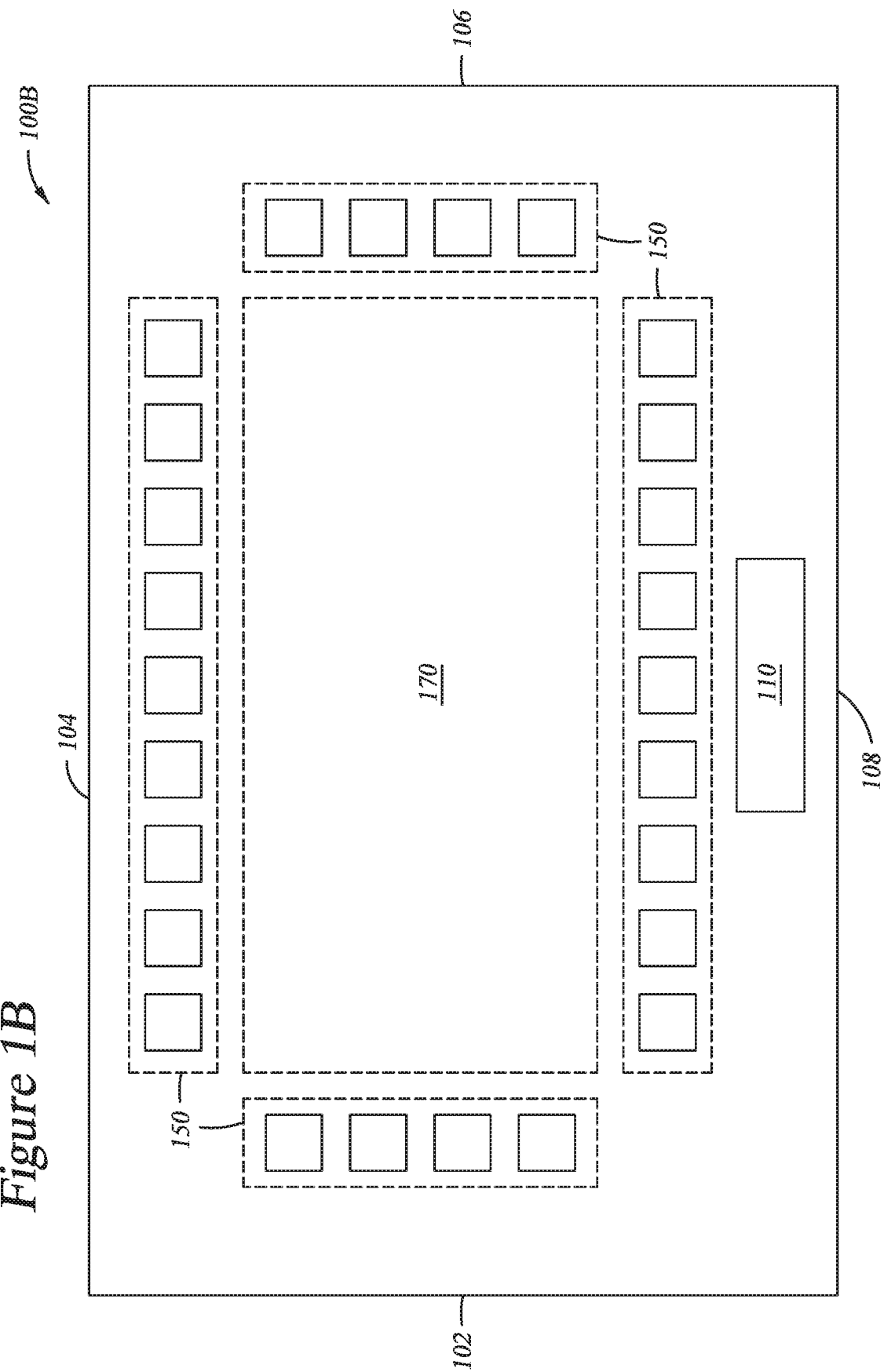
FIG. 1B is a schematic block diagram of an input device, according to one or more embodiments.
Figure 1E:
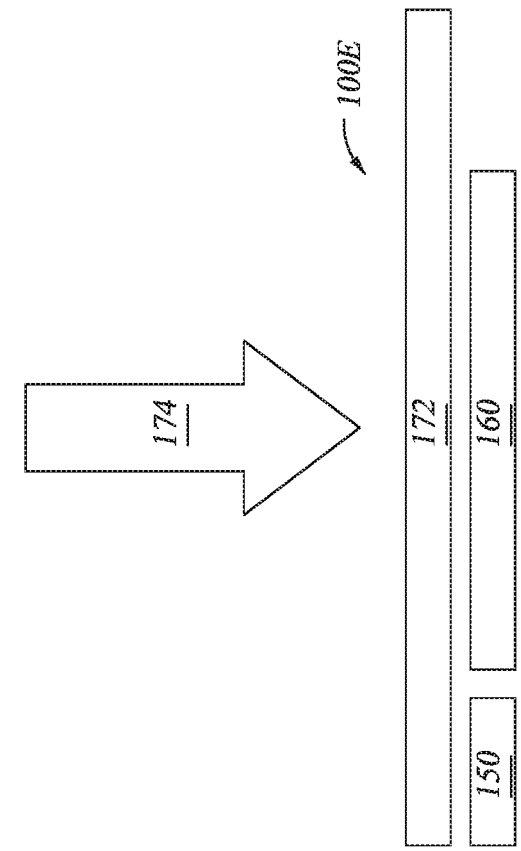
FIG. 1E is a schematic block diagram of an input device, according to one or more embodiments.
Figure 1C:
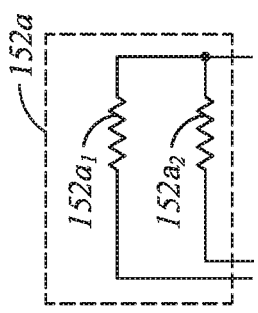
FIG. 1C is a schematic diagram of a force sensor, according to one or more embodiments

FIG. 1C illustrates an embodiment of a half-bridge strain gauge of the force sensor 152a. As illustrated, the force sensor 152a includes strain gauges $152a_1$ and $152a_2$. The strain gauges $152a_1$ and $152a_2$ are disposed electrically parallel to each other and are driven with different voltages (e.g., $V_1$ and $V_2$ or $V_3$). A first end of the strain gauge $152a_1$ is coupled to a first voltage source (e.g., a first one of the one or more voltage sources 180 of FIG. 1) and a second end of the strain gauge $152a_1$ is coupled to a trace (e.g., the trace 142 of FIG. 1). Further, a first end of the strain gauge $152a_2$ is coupled to a second voltage source (e.g., a second one of the one or more voltage sources 180 of FIG. 1) and a second end of the strain gauge $152a_2$ is coupled to a trace (e.g., the trace 142 of FIG. 1). The configuration of the force sensor 152a is described in greater detail with regard to FIGS. 2-4.

Figure 1D:
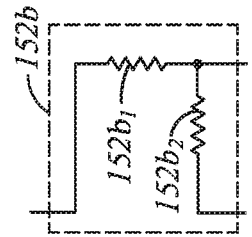
FIG. 1D is a schematic diagram of a force sensor, according to one or more embodiments.

FIG. 1D illustrates an embodiment of a half-bridge strain gauge of the force sensor 152b. As illustrated, the force sensor 152b includes strain gauges $152b_1$ and $152b_2$. The strain gauges $152b_1$ and $152b_2$ are disposed perpendicular to each other and are driven with different voltages (e.g., $V_1$ and $V_2$ or $V_3$). A first end of the strain gauge $152b_1$ is coupled to a first voltage source (e.g., a first one of the one or more voltage sources 180 of FIG. 1) and a second end of the strain gauge $152b_1$ is coupled to a trace (e.g., the trace 142 of FIG. 1). Further, a first end of the strain gauge $152b_2$ is coupled to a second voltage source (e.g., a second one of the one or more voltage sources 180 of FIG. 1) and a second end of the strain gauge $152b_2$ is coupled to a trace (e.g., the trace 142 FIG. 1). The configuration of the force sensor 152b is described in greater detail with regard to the description related to FIGS. 5-7.

With further reference to FIG. 1A, the force sensors 152-158 are disposed along one or more edges of the input device 100A. For example, the force sensors 152 and 154 are disposed along edge 102 of the input device 100A, and the force sensors 156 and 158 are disposed along edge 104. Further, the force sensors 152 and 154 are disposed between the edge 102 and the active area 170. Additionally, the force sensors 156 and 158 are disposed between the edge 104 and the active area 170. The force sensors 152-158 may be disposed on a common layer (e.g., common substrate) with one or more of the sensor electrodes 160. Alternatively, the force sensors 152-158 may be disposed on a different layer (e.g., different substrate) from the sensor electrodes 160. As illustrated in FIG. 1A, the force sensors 152-158 may be disposed on the substrate 101. The substrate 101 may be thin-film-transistor (TFT) substrate of a display device. Further, the substrate 101 may be a glass substrate or a plastic substrate. In one or more embodiments, the strain gauges of the force sensors 152-158 may be embedded within the substrate of a display device of the input device 100A.

In various embodiments, the number of force sensors 152-158 may be different from that illustrated in FIG. 1A. For example, various embodiments may employ more than four force sensors. Force sensors are disposed along at least two edges of the input device 100A. Further, force sensors are disposed along at least three edges of the input device 100A. In one embodiment, force sensors are disposed along each edge of the input device 100A.

The sensor driver 130 is coupled to each of the force sensors 152-158 via a respective one of the traces 142-148. Further, the sensor driver 130 may include receivers 132, and each of the force sensors 152-158 are coupled to a respective one of the receivers 132 via a respective trace. For example, the force sensor 152 is coupled to the receiver 132a via the trace 142, the force sensor 154 is coupled to the receiver 132b via the trace 144, the force sensor 156 is coupled to the receiver 132c via the trace 146, and the force sensor 158 is coupled to the receiver 132d via the trace 148. Each of the receivers 132 may comprise receiver circuitry configured to receive a force sensing signal from a respective one or more of the force sensors 152-158. For example, the receivers 132 may include one or more of integrator circuitry, filter circuitry, sample and hold circuitry, analog to digital converter, and a demodulator, among others.

In one embodiment, each of the receivers 132 may be differential receivers. In such an embodiment, each receiver 132 is coupled to two force sensors. For example, the receiver 132a is coupled to the force sensors 152, and 154 and the receiver 132b may is coupled to the force sensors 156 and 158.

In one or more embodiments, the force sensors 152-158 are coupled to the receivers 132 via one or more multiplexers 136. For example, the force sensors 152 and 154 may be coupled to the receiver 132a via first multiplexer (e.g., a first one of the multiplexers 136) and the force sensors 156 and 158 may be coupled to the receiver 132b via a second multiplexer (e.g., a second one of the multiplexers 136). In another embodiment, where the receivers 132 are differential receivers, the force sensors 152 and 154 and the force sensors 156 and 158 may be coupled to the receiver 132 via a first multiplexer.

The determination module 134 is configured to generate force information indicative of the force applied by the one or more input objects 140. For example, the determination module 134 may be configured to generate a force measurement for each force sensor 152-158 from the force resulting signals received from each force sensor in response to one or more input objects contacting the input device 100A. The force measurement may be one or more of a change in force measurement and a force value. In one embodiment, the determination module 134 compares each of the force resulting signals to a baseline to generate the force measurement. The baseline may be acquired when no force is determined to be applied to the input device 100A (e.g., no input object is present) and compared to each force resulting signal to remove interference and background measurements (e.g., circuitry characteristics).

In one embodiment, the determination module 134 compares two more sequentially received force measurements or force resulting signals for each of the force sensors 152-158 to determine a change in force measurement for each of the force sensors. In one embodiment, the determination module 134 generates a force value from each received force resulting signal.

The determination module 134 may compare the force measurements to one or more force thresholds. In such embodiments, the determination module 134 may output an indication as to which force threshold was satisfied. For example, in an embodiment where a single force threshold is utilized, the output may be an indication as to whether the force measurement exceeds the force threshold. Using a single force threshold provides a binary result. Increasing the number of force thresholds increases the number of force levels that may be supported by the input device 100A. In various embodiments, the determination module 134 outputs an indication of the force value and/or change in force measurement for each force sensor, for example, how much force is applied to the surface of the input device 100A by the one or more input objects 140.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information can be provided for each object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

FIG. 1B illustrates an input device 100B, according to one or more embodiments. As illustrated in FIG. 1B, the input device 100B includes a plurality of force sensors 150. The force sensors 150 may be disposed along each edge 102, 104, 106, and 108 of the input device 100B. Alternatively, the force sensors 150 may be disposed along two or more edges 102, 104, 106, and 108 of the input device 100B. Each of the force sensors 150 may be configured similar to that of the force sensors 152-158. The input device 100B is interfaced with processing system 110 as described above with regard to FIG. 1A and the input device 100A.

FIG. 1E is a schematic side view of an input device 100E, according to one or more embodiments. The input device 100E is configured similar to that of the input device 100A and/or 100B. For example, the input device 100E includes one or more force sensors 150, and sensor electrodes 160. Further, while the force sensor 150 and the sensor electrodes 160 are illustrated as being co-planer in the input device 100E, in other embodiments, the sensor electrodes 160 and the force sensor 150 are disposed on different layers.

The input device 100E includes the input surface 172. The input surface 172 is parallel to the plane including the sensor electrodes 160 and the force sensor 150. Further, the input force 174 is perpendicular to, or normal to, the input surface 172. In various embodiments, the input force 174 may be referred to as a vertical input force. In one embodiment, the input force 174 is applied by one or more of the input objects 140.

Figure 2:
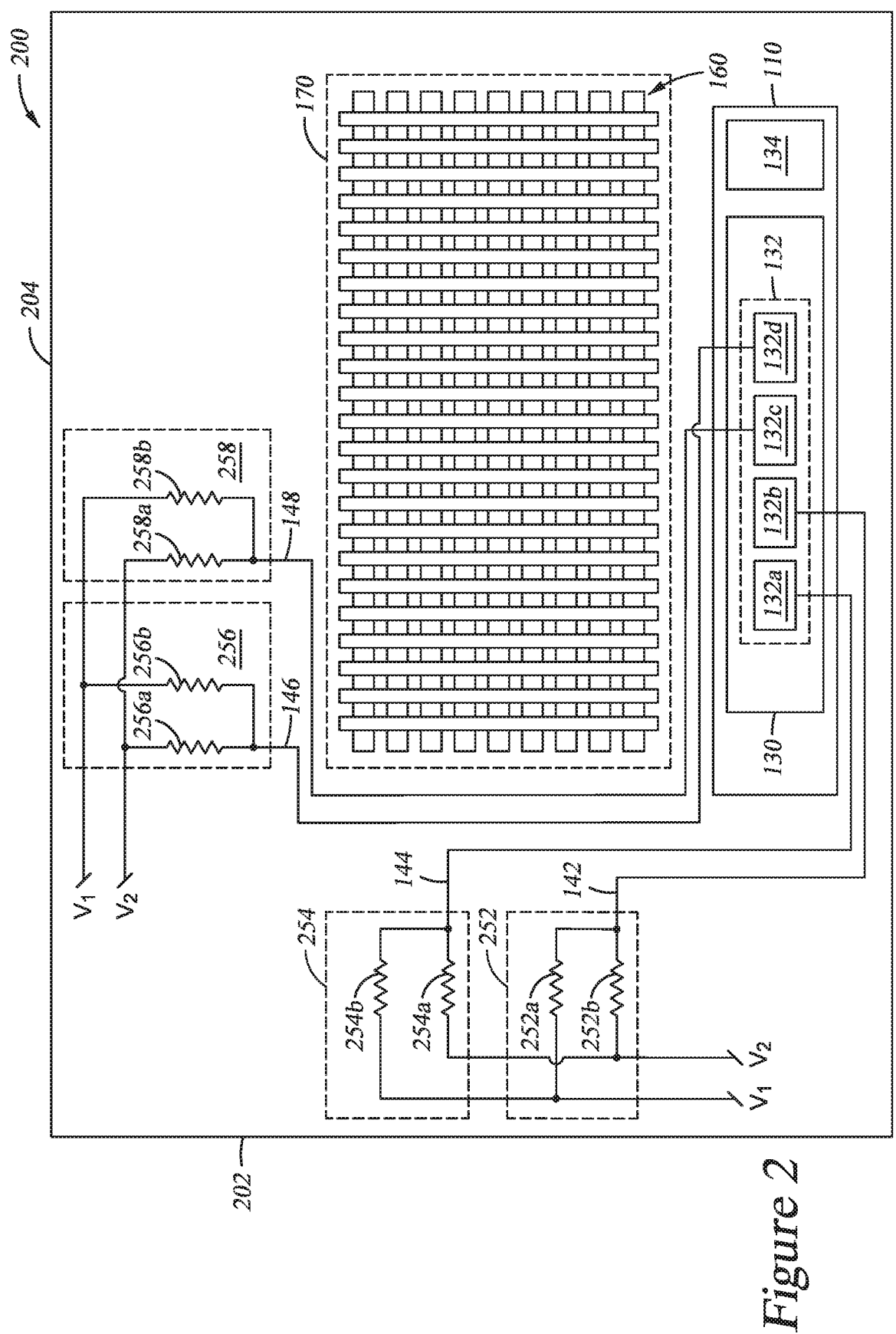
FIG. 2 is a schematic block diagram of an input device, according to one or more embodiments.

FIG. 2 illustrates an input device 200, according to one or more embodiments. The input device 200 is configured similar to the input device 100A of FIG. 1A. For example, the input device 200 includes the processing system 110, the sensor driver 130, the receivers 132, the determination module 134 and sensor electrodes 160 as described with regard to FIG. 1A. The force sensors 252-258 are disposed around active area 170, and are coupled to the processing system 110. The force sensors 252-258 are configured similar to that of the force sensors 152-158 of FIG. 1A. For example, the force sensors 252-258 generate force resulting signals in response to an input force (e.g., strain).

Each of the force sensors 252-258 comprises at least two strain gauges. Further, each force sensor 252-258 comprises a strain gauge of a first type and a strain gauge of a second type that is different than the first type. The first and second strain gauge types may be different types of semiconductor strain gauges. In one example, the first type is an n-type strain gauge, while the second type is a p-type strain gauge. In an n-type strain gauge, the average mobility of the electrons is reduced in response to an input force. As configured in the embodiment of FIG. 2, an input force applied to the input device 200 results in the resistivity of an n-type strain gauge increasing. Further, as the mobility of the electrons is reduced, the gauge factor for an n-type strain gauge is negative. In a p-type strain gauge, the mobility of the holes is increased in response to the input force, decreasing the resistivity of the p-type strain gauge. Further, as the mobility of the holes is increased, the gauge factor for a p-type strain gauge is positive.

In response to strain caused by an input force normal to the input surface of the input device 200, the response (e.g., force resulting signal) of an n-type strain gauge is negative while the response (e.g., force resulting signal) of the p-type strain gauge is positive. Further, the magnitude of the force resulting signal of the n-type strain gauge and the p-type strain gauge is substantially similar. The differences the magnitude of the force resulting signals of the n-type strain gauge and the p-type strain gauge may be due to manufacturing tolerances. In one or more embodiments, in response to a common force, the magnitude of the force resulting signals of the n-type and p-type strain gauges are substantially similar such that force resulting signals may be utilized to mitigate common mode noise within the resulting signals provided by the strain gauges. Common mode noise may include thermal drift and circuit differences within the processing system 110.

The strain gauges of each of the force sensors 252-258 are oriented in a common direction. For example, the strain gauges of each force sensor 252-258 may have a configuration selected to measure strain perpendicular to an input surface of the input device 200. Accordingly, the resistance of the strain gauges of the force sensors 252-258 changes in response to strain perpendicular to an input surface (e.g., the input surface 172) of the input device 200, where strain perpendicular to the input surface corresponds to input force applied normally to the input surface of the input device 200. As illustrated in FIG. 1C, the input surface is parallel to the plane of the strain gauges of the force sensors 252-258.

The force sensor 252 includes strain gauge 252a and strain gauge 252b. The strain gauge 252a is one of an n-type strain gauge and a p-type strain gauge, and the strain gauge 252b is the other one of an n-type strain gauge and a p-type strain gauge. Further, the strain gauges 252a and 252b may be oriented in a common direction such that the long axis of each strain gauge is parallel to each other. As illustrated in FIG. 2, the first end of the strain gauge 252a is coupled to a voltage source (e.g., the voltage source 180) configured to provide voltage $V_1$ and the second end of the strain gauge 252a is coupled to the trace 142. The first end of the strain gauge 252b is coupled to a voltage source (e.g., the voltage source 180) configured to provide voltage $V_2$ and a second end of the strain gauge is coupled to the trace 142 and the second end of the strain gauge 252a.

The resistance of the strain gauges 252a and 252b, the strain gauges 252a and 252b being different ones of an n-type strain gauge and a p-type strain gauge, increases or decreases in response to the amount of input force applied to the input surface (e.g., the input surface 172) of the input device 200. Further, as the strain gauges 252a and 252b have a common orientation and are coupled to different DC voltages, the force resulting signal output by the force sensor 252 is a combination of the force resulting signal output by the strain gauge 252a and the force resulting signal output by the strain gauge 252b. For example, the magnitude of the force resulting signal output by the force sensor 252 is equal to the combined magnitudes of the force resulting signals output by the strain gauge 252a and the strain gauge 252b. Alternatively, the magnitude of the force resulting signal output by the force sensor 252 is equal to a difference between the force sensing signal output by the strain gauge 252a and the force sensing signal output by the strain gauge 252b.

The force sensor 254 includes strain gauge 254a and strain gauge 254b. The strain gauge 254a is one of an n-type strain gauge and a p-type strain gauge, and the strain gauge 254b is the other one of an n-type strain gauge and a p-type strain gauge. Further, the strain gauges 254a and 254b may be oriented in a common direction, similar to that of the strain gauges 252a and 252b. The first end of the strain gauge 254a is coupled to a voltage source (e.g., the one or more voltage sources 180 of FIG. 1A) that provides voltage $V_2$ and the second end of the strain gauge 254a is coupled to the trace 144. Additionally, the first end of the strain gauge 254b is coupled to a voltage source (e.g., the one or more voltage sources 180 of FIG. 1A) configured to provide voltage $V_1$ and a second end of the strain gauge is coupled to the trace 144 and the second end of the strain gauge 254a.

The resistance of the strain gauges 254a and 254b increases or decreases in response to an input force. Further, as the strain gauges 254a and 254b have a common orientation, the force resulting signal output by the force sensor 254 is a combination of the force resulting signal output by the strain gauge 254a and the force resulting signal output by the strain gauge 254b. For example, the magnitude of the force resulting signal output by the force sensor 254 is equal to the combined magnitudes of the force resulting signals output of the strain gauge 254a and the strain gauge 254b. Alternatively, the magnitude of the force resulting signal output of the force sensor 254 is equal to a difference between the force sensing signal output of the strain gauge 254a and the force sensing signal output of the strain gauge 254b.

The polarity of the force sensor 252 differs from the polarity of the force sensor 254. For example, the polarity of the force sensor 252 may be positive and the polarity of the force sensor 254 may be negative. In one embodiment, the polarity of the force sensors 252 and 254 may correspond to $V_1$ and $V_2$. For example, in embodiments where $V_2$ is greater than $V_1$, the polarity of the force sensor 252 is positive and the polarity of the force sensor 254 is negative. However, in embodiments where $V_1$ is greater than $V_2$, the polarity of the force sensor 254 is positive and the polarity of the force sensor 252 is negative.

The force sensor 256 includes strain gauge 256a and strain gauge 256b. The strain gauge 256a is one of an n-type strain gauge and a p-type strain gauge and the strain gauge 256b is the other one of an n-type strain gauge and a p-type strain gauge. Further, the strain gauges 256a and 256b may be oriented in a common direction as described with regard to strain gauges 252a and 252b. In one embodiment, the long axis of each of the strain gauges 256a and 256b are disposed parallel to the edge 202 of the input device 200 such that the strain gauges are electrically parallel to each other.

The first end of the strain gauge 256a is coupled to a voltage source (e.g., the voltage source 180) configured to provide voltage $V_1$ and the second end of the strain gauge 256a is coupled to the trace 146. Further, the first end of the strain gauge 256b is coupled to a voltage source (e.g., the one or more voltage sources 180 of FIG. 1A) that provides voltage $V_2$ and a second end of the strain gauge is coupled to the trace 146 and the second end of the strain gauge 256a. In one embodiment, a voltage source that provides voltage $V_3$ may be used instead of one that provides voltages $V_1$ or $V_2$.

The resistance of the strain gauge 256a and 256b increases or decreases in response to an increase in the input force, altering the corresponding force resulting signal. As the strain gauges 256a and 256b have a common orientation, the force resulting signal output by the force sensor 256 is a combination of the force resulting signal output by the strain gauge 256a and the force resulting signal output by the strain gauge 256b. For example, the magnitude of the force resulting signal output by the force sensor 256 is equal to the combined magnitudes of the force resulting signals output by the strain gauge 256a and the strain gauge 256b. Alternatively, the magnitude of the force resulting signal output by the force sensor 256 is equal to a difference between the force sensing signal output by the strain gauge 256a and the force sensing signal output by the strain gauge 256b.

The force sensor 258 includes strain gauge 258a and strain gauge 258b. The strain gauge 258a is one of an n-type strain gauge and a p-type strain gauge, and the strain gauge 258b is the other one of an n-type strain gauge and a p-type strain gauge. Further, the strain gauges 258a and 258b may be oriented in a common direction as described with regard to strain gauges 252a and 252b. In one embodiment, the long axis of each of the strain gauges 258a and 258b are disposed parallel to the edge 202 of the input device 200 such that the strain gauges are electrically parallel to each other. The first end of the strain gauge 258a is coupled to the voltage source (e.g., the one or more voltage sources 180 of FIG. 1A) that provides voltage $V_2$ and the second end of the strain gauge 258a is coupled to the trace 148. Further, the first end of the strain gauge 258b is coupled to a voltage source (e.g., the voltage source 180) configured to provide voltage $V_1$ and a second end of the strain gauge is coupled to the trace 148 and the second end of the strain gauge 258a.

The resistance of the strain gauge 258a and 258b increases or decreases in response to an input force, altering the corresponding force resulting signal. The strain gauges 258a and 258b have a common orientation. Accordingly, the force resulting signal output by the force sensor 258 is a combination of the force resulting signal output by the strain gauge 258a and the force resulting signal output by the strain gauge 258b. For example, the magnitude of the force resulting signal output by the force sensor 258 is equal to the combined magnitudes of the force resulting signals output by the strain gauge 258a and the strain gauge 258b. Alternatively, the magnitude of the force resulting signal output by the force sensor 258 is equal to a difference between the force sensing signal output by the strain gauge 258a and the force sensing signal output by the strain gauge 258b.

The polarity of the force sensor 256 differs from the polarity of the force sensor 258. For example, the polarity of the force sensor 256 may be positive and the polarity of the force sensor 258 may be negative. In one embodiment, the polarity of the force sensors 256 and 258 may correspond to $V_1$ and $V_2$. For example, in embodiments where $V_2$ is greater than $V_1$, the polarity of the force sensor 256 is positive and the polarity of the force sensor 258 is negative. However, in embodiments where $V_1$ is greater than $V_2$, the polarity of the force sensor 256 is positive and the polarity of the force sensor 258 is negative.

The force sensors 252-258 may be configured as half-bridge strain gauges. Further, the force sensors 252-258 may be disposed along the perimeter of the input device 200. For example, the force sensor 252-258 may be disposed between the active area 170 and edges 202 and 204 of the input device 200, respectively.

Figure 3:
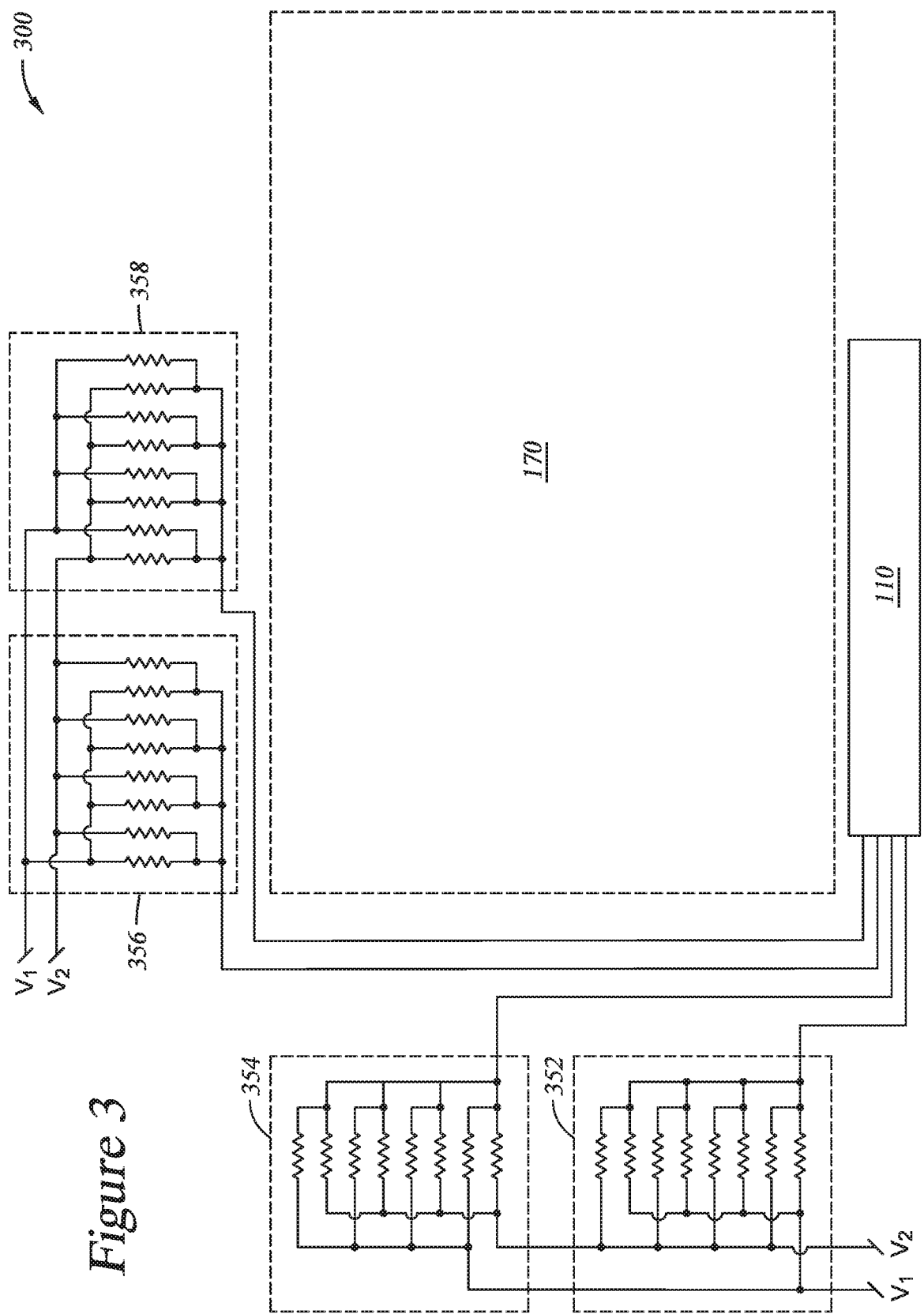
FIG. 3 is a schematic block diagram of an input device, according to one or more embodiments.

FIG. 3 illustrates an input device 300, according to one or more embodiments. In the embodiment of FIG. 3, the input device 300 includes force sensors 352-358 coupled to the processing system 110. Each of the force sensors 352-358 are configured similar to the force sensors 252-258 of FIG. 2 and are disposed proximate the active area 170. However, as compared to the force sensors 252-258, the force sensors 352-358 include multiple half-bridges coupled in parallel. For example, each force sensor 352-358 is comprised of four half-bridges coupled to one or more voltages sources configured to provide $V_1$ and $V_2$. However, in other embodiments, each force sensor 352-358 may be comprised of less than or more than four half-bridges. Each half-bridge is formed from two strain gauges as illustrated in and described with regard to FIG. 2. Increasing the number of half-bridges in each force sensor 352-358 may increase the spatial coverage of each of the force sensors. Further, the half-bridges of each force sensor 352-358 are connected in parallel. Accordingly, the corresponding force resulting signal output by each force sensor is a composite of the change in force, or strain, of each half-bridge of each force sensor. For example, in one embodiment, connecting the half-bridges in parallel generates a force resulting signal that is an average of the change in force, or strain, of each half-bridge of each force sensor. One or more of the force sensors 352-358 may have a different number of strain gauges than another one or more of the force sensors 352-358. Alternatively, each of force sensors 352-358 may have the same number of strain gauges.

In the embodiment illustrated in FIG. 3, strain gauges of different types are interleaved with each other in each force sensor 352-358. For example, in each force sensor 352-358, n-type strain gauges are interleaved with p-type strain gauges.

Figure 4:
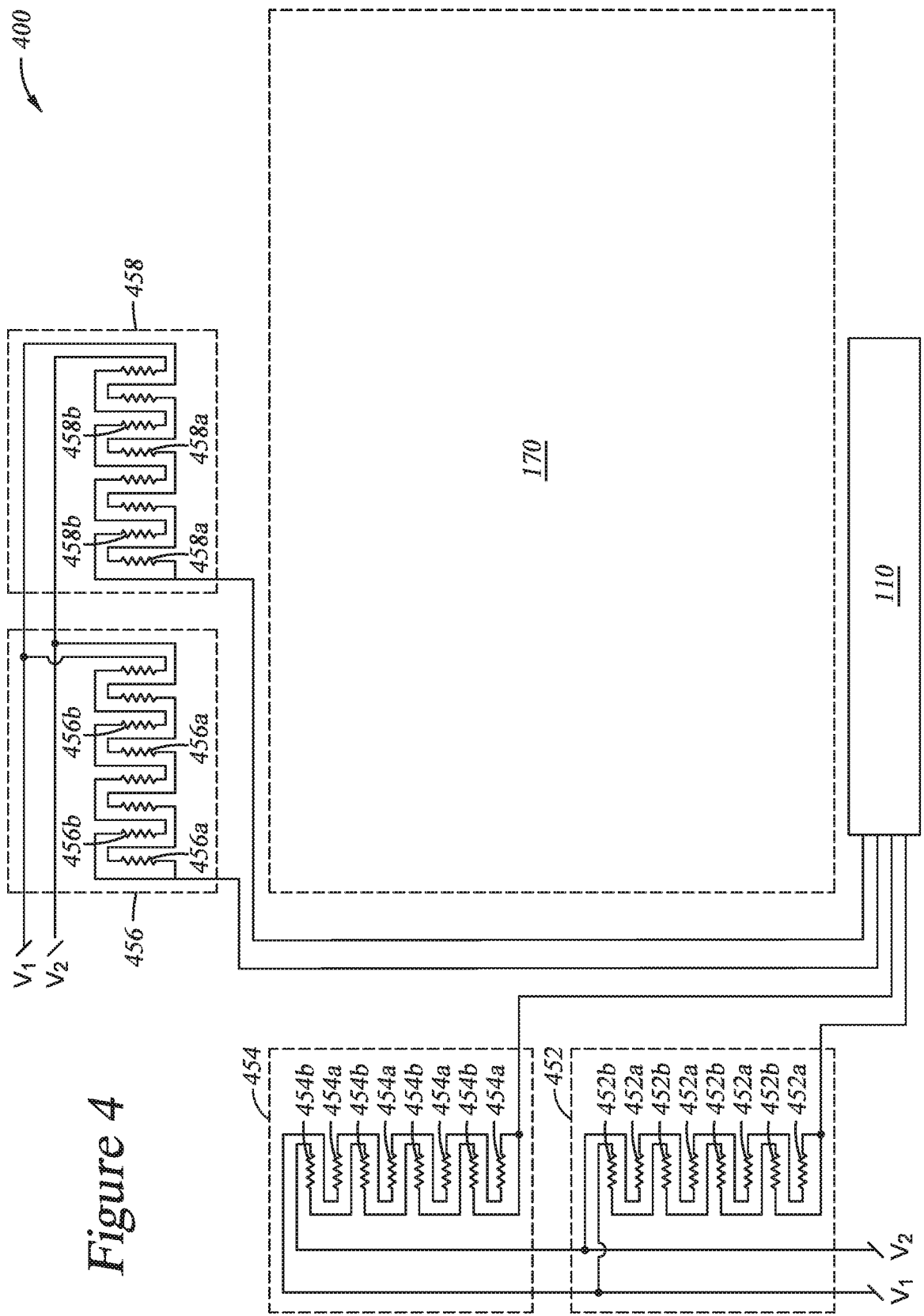
FIG. 4 is a schematic block diagram of an input device, according to one or more embodiments.

FIG. 4 illustrates an input device 400, according to one or more embodiments. As illustrated in FIG. 4, each force sensor 452-458 is disposed proximate the active area 170 and comprised of multiple half-bridges. Each of the force sensors 452-458 are coupled to the processing system 110. However, as compared to FIG. 3, while the half-bridges of each force sensor 352-358 are coupled in parallel, the half-bridges of each force sensor 452-458 are coupled in series. Accordingly, alternating strain gauges of each force sensor are coupled in series with each other. For example, the strain gauges 452a of the force sensor 452 are connected in series with each other, and the strain gauges 452b of the force sensor 452 are connected in series with each other. Further, the strain gauges 454a of the force sensor 454 are connected in series with each other, and the strain gauges 454b of the force sensor 454 are connected in series with each other. Additionally, the strain gauges 456a of the force sensor 456 are connected in series with each other, and the strain gauges 456b of the force sensor 456 are connected in series with each other. The strain gauges 458a of the force sensor 458 are connected in series with each other and the strain gauges 458b of the force sensor 458 are connected in series with each other.

In the embodiment illustrated in FIG. 4, strain gauges of different types are interleaved with each other in each force sensor 352-358. For example, in each force sensor 352-358, n-type strain gauges are interleaved with p-type strain gauges.

The force resulting signal output by each force sensor 452-458 is a composite of the change in force, or strain, of each half-bridge of each force sensor 452-458. In one embodiment, the force resulting signal output by each force sensor is a combined, or summed, change in force of each half-bridge. Further, each of the force sensors 452-458 is configured similar to that of the force sensors 252-258. In one or more embodiments, each force sensor 452-458 is comprised of four half-bridges, each comprising a first and second strain gauge. However, in other embodiments, one or more of the force sensors 452-458 may be comprised of less than or more than four half-bridges. Further, one or more of the force sensors 452-458 may have a different number of half-bridges than another one or more of the force sensors 452-458.

Figure 5:
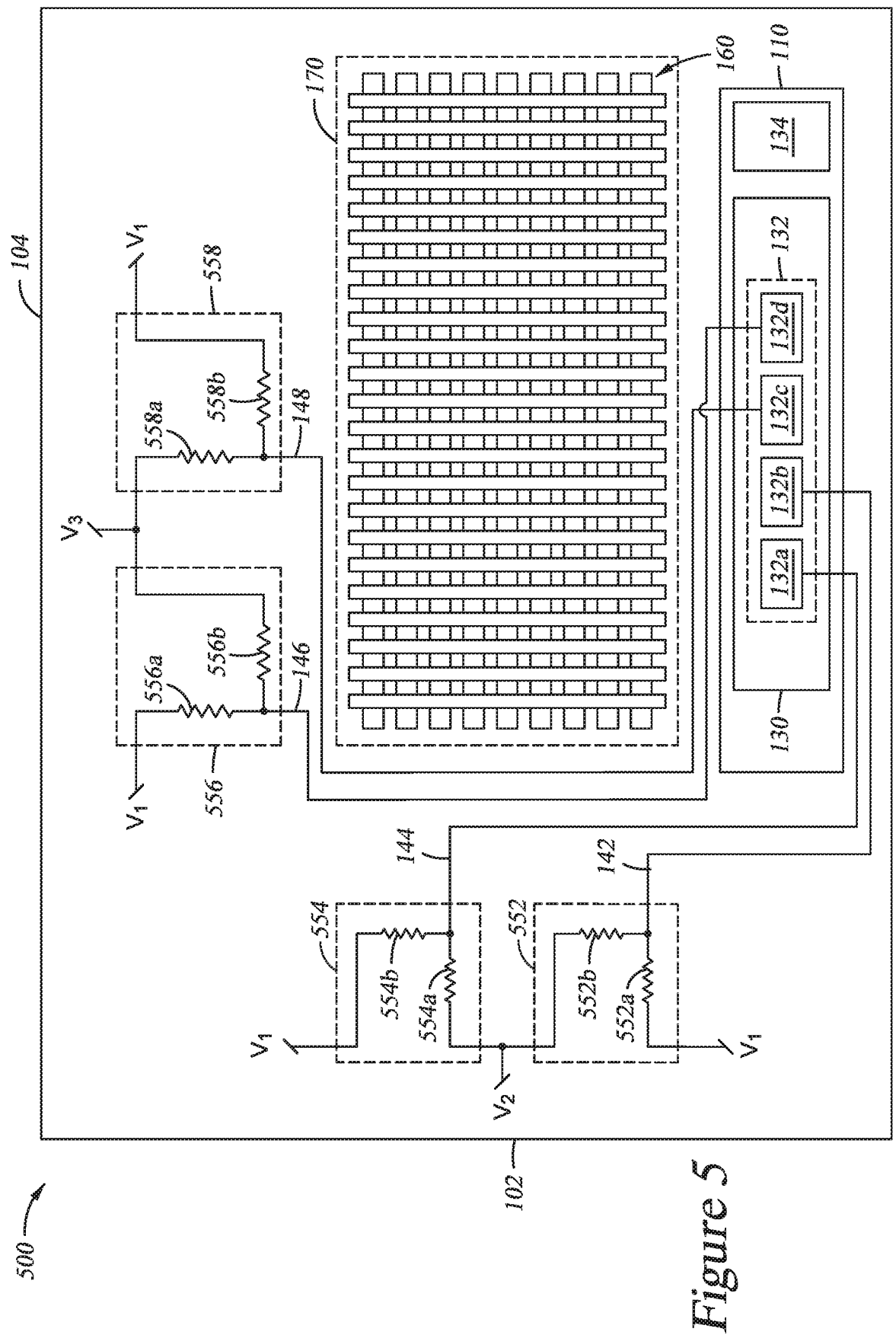
FIG. 5 is a schematic block diagram of an input device, according to one or more embodiments.

FIG. 5 illustrates an input device 500, according to one or more embodiments. The input device 500 is configured similar to that of the input device 100A of FIG. 1A. For example, the input device 500 includes the processing system 110, the traces 142-148, the sensor electrodes 160, and the active area 170. Further, the input device 500, includes the force sensors 552-558 disposed along two more sides of the active area 170. The force sensors 552-558 are coupled to respective one of the receivers 130 of the sensor driver 130 of the processing system 110 via respective ones of the traces 142-148, and are configured to generate force resulting signals.

Each of the force sensors 552-558 comprises two strain gauges. For example, the force sensor 552 includes strain gauge 552a and strain gauge 552b. In one embodiment, the components of the strain gauge 552a and the strain gauge 552b are identical such that the strain gauges 552a and 552b are matching. For example, the length and/or width of the strain gauges 552a and 552b is the same (e.g., within manufacturing tolerances of each other). Further, the strain gauges 552a and 552b are of a common type. For example, the strain gauges 552a and 552b are each either p-type strain gauges or n-type strain gauges. Further, the long axis of the strain gauge 552a is perpendicular to the long axis of the strain gauge 552b. For example, the long axis of the strain gauge 552a is disposed parallel to the edge 102 of the input device 500 and the long axis of the strain gauge 552b is disposed parallel to the edge 104 of the input device 500. The first end of the strain gauge 552a is coupled to the voltage source ((e.g., the one or more voltage sources 180 of FIG. 1A) configured to provide voltage $V_1$, and the second end of the strain gauge 552a is coupled to a trace 142 and to a first end of the strain gauge 552b. The trace 142 is coupled to the sensor driver 130 of the processing system 110. The second end of the strain gauge 552b is coupled to the voltage source (e.g., the one or more voltage sources 180 of FIG. 1A) that provides voltage $V_2$. In one embodiment, $V_1$ is a ground of the input device 500.

The resistance of at least one of the strain gauges 552a and 552b increases in response to an input force, altering the corresponding force resulting signal communicated to the processing system 110.

The force sensor 554 includes strain gauge 554a and strain gauge 554b. The components of the strain gauge 554a and the strain gauge 554b may be identical such that the strain gauges 554a and 554b are matching. For example, the length and/or width of the strain gauges 554a and 554b is the same (e.g., within manufacturing tolerances of each other). Further, the strain gauges 554a and 554b are of a common type. For example, the strain gauges 554a and 554b are each either p-type strain gauges or n-type strain gauges. Further, the long axis of the strain gauge 552a is perpendicular to the long axis of the strain gauge 552b. For example, the long axis of the strain gauge 552a is disposed parallel to the edge 102 of the input device 500 and the long axis of the strain gauge 552b is disposed parallel to the edge 104 of the input device 500. A first end of the strain gauge 554a is coupled to a voltage source (e.g., the one or more voltage sources 180 of FIG. 1A) that provides voltage $V_2$ and the second end of the strain gauge 554a is coupled to a trace 144 and to a first end of the strain gauge 554b. The trace 144 is coupled to the sensor driver 130 of the processing system 110. The second end of the strain gauge 554b is coupled to the voltage source (e.g., the one or more voltage sources 180 of FIG. 1A) configured to provide the voltage $V_1$.

The resistance of at least one of the strain gauges 554a and 554b increases in response to an input force, altering the corresponding force resulting signal communicated to the processing system 110.

The polarity of the force sensor 552 differs from the polarity of the force sensor 554. For example, the polarity of the force sensor 552 may be positive and the polarity of the force sensor 554 may be negative, such that the magnitude of the force resulting signal output by the force sensor 552 is opposite that of the force resulting signal output by the force sensor 554. In one embodiment, the polarity of the force sensors 552 and 554 corresponds to $V_1$ and $V_2$. For example, in embodiments where $V_2$ is greater than $V_1$, the polarity of the force sensor 552 is positive and the polarity of the force sensor 554 is negative. However, in embodiments where $V_1$ is greater than $V_2$, the polarity of the force sensor 554 is positive and the polarity of the force sensor 552 is negative.

The force sensor 556 includes the strain gauge 556a and strain gauge 556b. The components of the strain gauge 556a and the strain gauge 556b are identical such that the strain gauges 556a and 556b are matching. For example, the length and/or width of the strain gauges 556a and 556b is the same (e.g., within manufacturing tolerances of each other). Further, the strain gauges 556a and 556b are of a common type. For example, the strain gauges 556a and 556b are each either p-type strain gauges or n-type strain gauges. Further, the long axis of the strain gauge 556a is perpendicular to the long axis of the strain gauge 556b. For example, the long axis of the strain gauge 556a is disposed parallel to the edge 102 of the input device 500 and the long axis of the strain gauge 556b is disposed parallel to the edge 104 of the input device 500. A first end of the strain gauge 556a is coupled to a voltage source (e.g., the one or more voltage sources 180 of FIG. 1A) configured to provide voltage $V_1$. A second end of the strain gauge 556a is coupled to a trace 146 and to a first end of the strain gauge 556b. The second end of the strain gauge 556b is coupled to a voltage source (e.g., the one or more voltage sources 180 of FIG. 1A) that provides voltage $V_3$. The trace 146 is coupled to the sensor driver 130 of the processing system 110.

The resistance of the strain gauge 556a and/or 556b may increase in response to an input force, altering the corresponding force resulting signal communicated to the processing system 110.

The force sensor 558 includes strain gauge 558a and strain gauge 558b. The components of the strain gauge 558a and the strain gauge 558b may be identical such that the strain gauges 558a and 558b are matching. For example, the length and/or width of the strain gauges 558a and 558b is the same (e.g., within manufacturing tolerances of each other). Further, the strain gauges 558a and 558b are of a common type. For example, the strain gauges 558a and 558b are each either p-type strain gauges or n-type strain gauges. Further, the long axis of the strain gauge 558a is perpendicular to the long axis of the strain gauge 558b. For example, the long axis of the strain gauge 558a is disposed parallel to the edge 102 of the input device 500 and the long axis of the strain gauge 558b is disposed parallel to the edge 104 of the input device 500. A first end of the strain gauge 558a is coupled to a voltage source (e.g., the voltage source 180) configured to provide voltage $V_3$. Further, a second end of the strain gauge 558a is coupled to a trace 148 and to a first end of the strain gauge 558b. The second end of the strain gauge 558b is coupled to a voltage source (e.g., the voltage source 180) configured to provide voltage $V_1$. The trace 148 is coupled to sensor driver 130 of the processing system 110.

The resistance of the strain gauge 558a or 558b may increase in response to an input force, altering the corresponding force resulting signal communicated to the processing system 110.

The polarity of the force sensor 556 differs from the polarity of the force sensor 558. For example, the polarity of the force sensor 556 may be positive and the polarity of the force sensor 558 may be negative. In one embodiment, the polarity of the force sensors 556 and 558 may correspond to $V_1$ and $V_3$. For example, in embodiments where $V_3$ is greater than $V_1$, the polarity of the force sensor 556 is positive and the polarity of the force sensor 558 is negative. However, in embodiments where $V_1$ is greater than $V_3$, the polarity of the force sensor 556 is positive and the polarity of the force sensor 558 is negative.

The force sensors 552-558 may be referred to as half-bridge strain gauges. Further, as the force sensors 552-558 may be disposed along the perimeter of the input device 500. For example, the force sensors 552-558 may be disposed between the active area 170 and edges 102 and 103 of the input device 500, respectively.

The strain gauges 552a, 554a, 556a, and 558a have a configuration selected to measure strain perpendicular to the input surface (e.g., the input surface 172) of the input device 500. Accordingly, the strain gauges 552a, 554a, 556a, and 558a change in response to strain caused by a force normal to an input surface of the input device 500 (e.g., the input surface 172 of FIG. 1C), which is the dominate force component of each of the force sensors 552-558. Further, a force normal to the input surface of the input device 500 may be referred to as a vertical input force.

In one or more embodiments, the strain gauges 552b, 554b, 556b, and 558b have a configuration selected to measure strain parallel to the edges 102 and 104, respectively. Accordingly, the strain gauges 552b, 554b, 556b, and 558b measure strain parallel to the input surface of the input device 500 (e.g., the input surface 172 of FIG. 1C) which remains close to zero in response to an input force normal to the input surface of the input device 500 (e.g., an input force orthogonal to the surface of the input device 500). Accordingly, the force applied to the strain gauges 552b, 554b, 556b, and 558b is close to zero and the change in resistances of the strain gauges 552b, 554b, 556b, and 558b is zero or close to zero. Accordingly, the force resulting signals provided by the strain gauges 552b, 554b, 556b, and 558b may be used as references to cancel output common mode noise within the force resulting signals provided by the strain gauges 552a, 554a, 556a, and 558a. Common mode noise may include thermal drift and circuit differences within the processing system 110.

In one or more embodiments, increasing the distance between force sensors 552 and 554 and/or between force sensors 556 and 558 along a corresponding edge 102, 104, increases the spatial coverage of the force sensors. Further, forming the force sensors 552-558 out of half-bridges may double the spatial node density as compared to embodiments employing force sensors formed out of full-bridge strain gauges.

Figure 6:
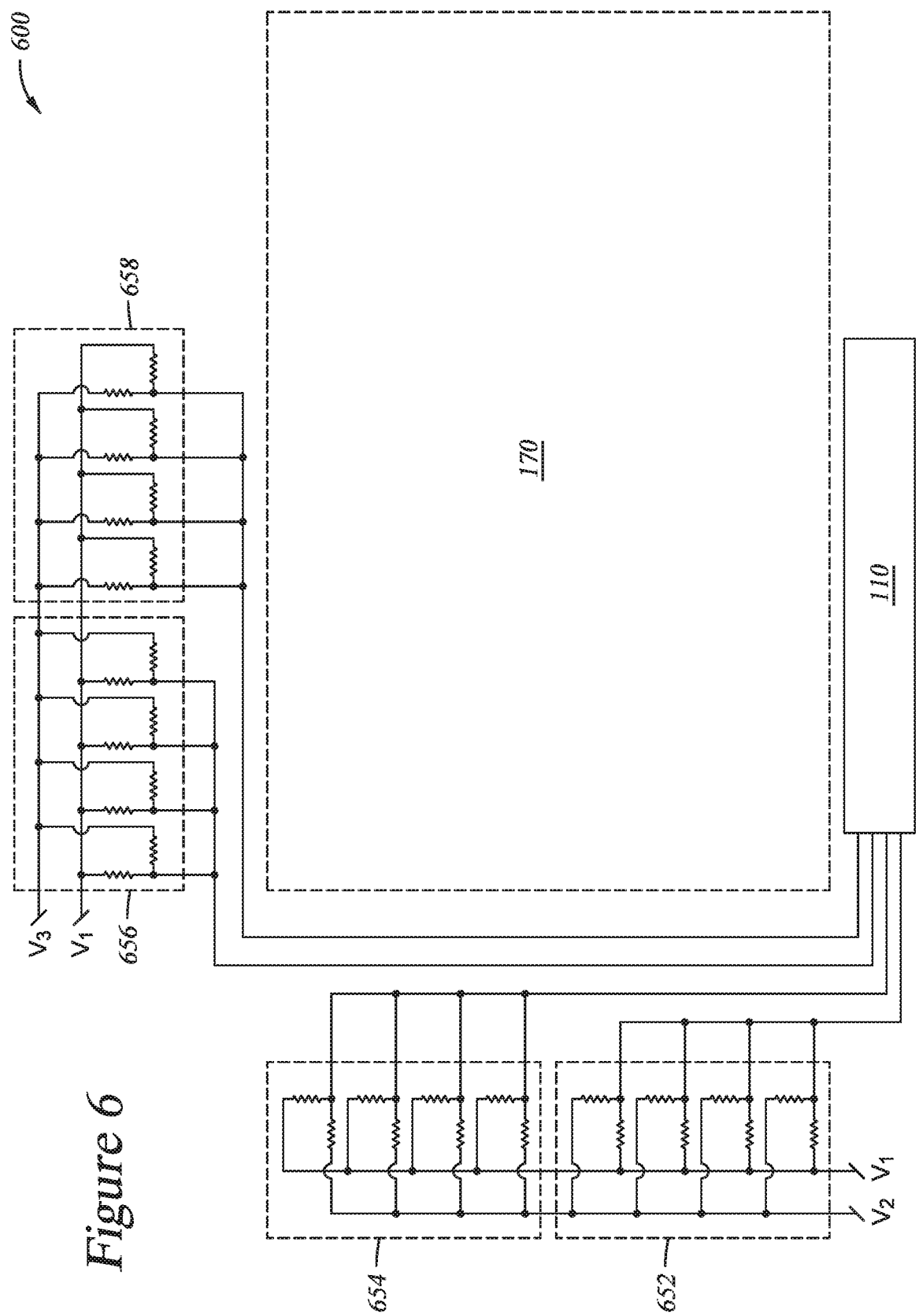
FIG. 6 is a schematic block diagram of an input device, according to one or more embodiments.

FIG. 6 illustrates the input device 600, according to one or more embodiments. In the embodiment of FIG. 6, the input device 600 includes force sensors 652-658 disposed proximate the active area 170 and coupled to the processing system 110. Each of the force sensors 652-658 are configured similar to that of the force sensors 552-558 of FIG. 5. However, as compared to the force sensors 552-558, the force sensors 652-658 include multiple half-bridges ohmically coupled in parallel. For example, each force sensor 652-658 is comprised of four half-bridges. However, in other embodiments, each force sensor 652-658 may be comprised of less than or more than four half-bridges. Each half-bridge is formed from two strain gauges as illustrated in FIG. 5. Increasing the number of half-bridges in each force sensor 652-658 may increase the spatial coverage of each of the force sensors. Further, the half-bridges of each force sensor 652-658 are connected in parallel. Accordingly, the corresponding force resulting signal output by each force sensor is a composite of the change in force, or strain, of each half-bridge of each force sensor. For example, in one embodiment, connecting the half-bridges in parallel generates a force resulting signal that is an average of the change in force, or strain, of each half-bridge of each force sensor.

Figure 7:
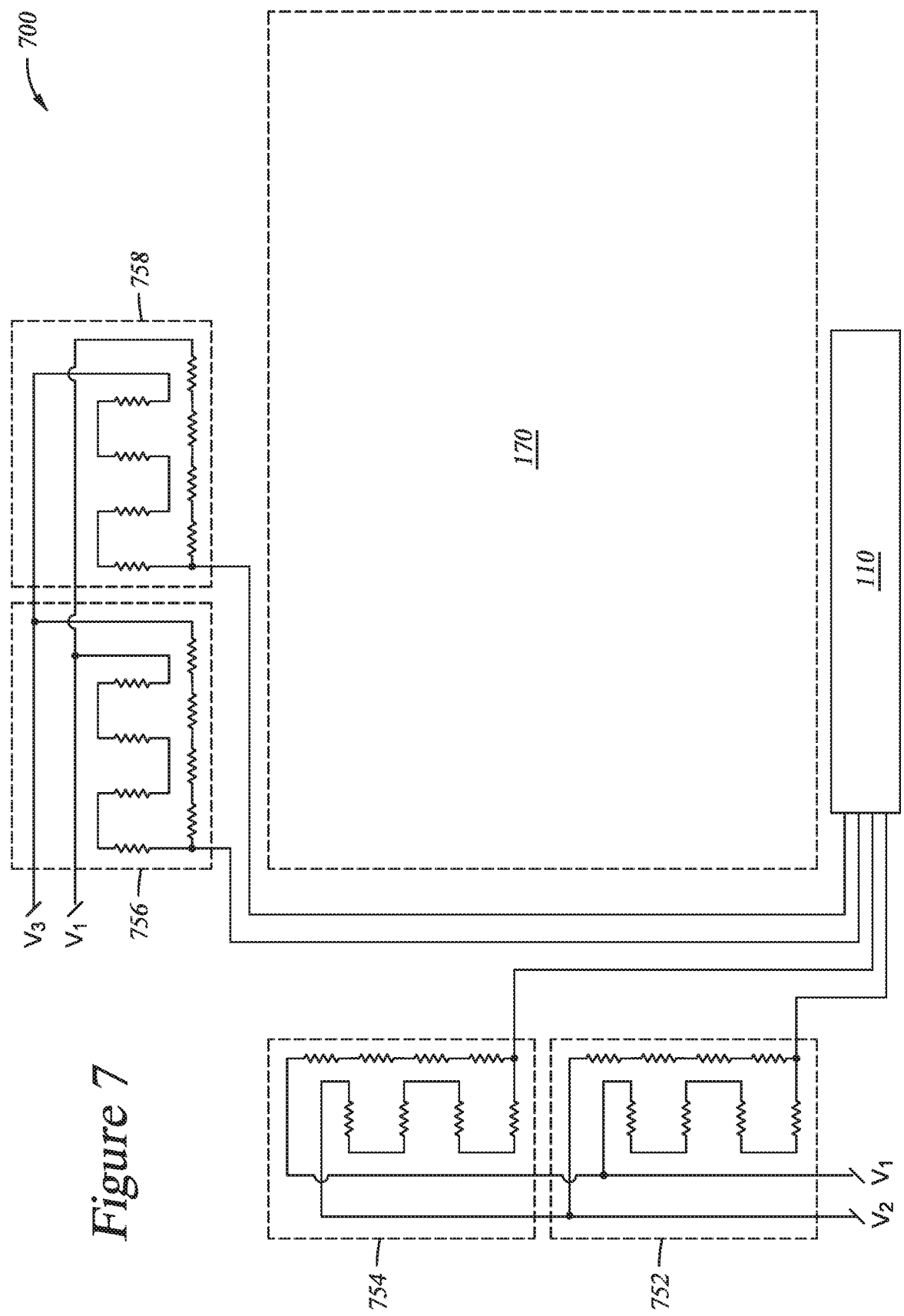
FIG. 7 is a schematic block diagram of an input device, according to one or more embodiments.

FIG. 7 illustrates the input device 700, according to one or more embodiments. As illustrated in FIG. 7, each force sensor 752-758 is comprised of multiple half-bridges, disposed proximate the active area 170, and coupled to the processing system 110. However, while the half-bridges of each force sensor 652-658 are coupled in parallel, the half-bridges of each force sensor 752-758 are coupled in series. According, the force resulting signal output by each force sensor 752-758 is a composite of the change in force, or strain, of each half-bridge. In one embodiment, the force resulting signal output by each force sensor is a combined, or summed, change in force of each half-bridge. Further, each of the force sensors 752-758 is configured similar to that of the force sensors 552-558. In one or more embodiments, each force sensor 752-758 is comprised of four half-bridges each comprising a first and second strain gauge. However, in other embodiments, each force sensor 752-758 may be comprised of less than or more than four half-bridges.

Figure 8:
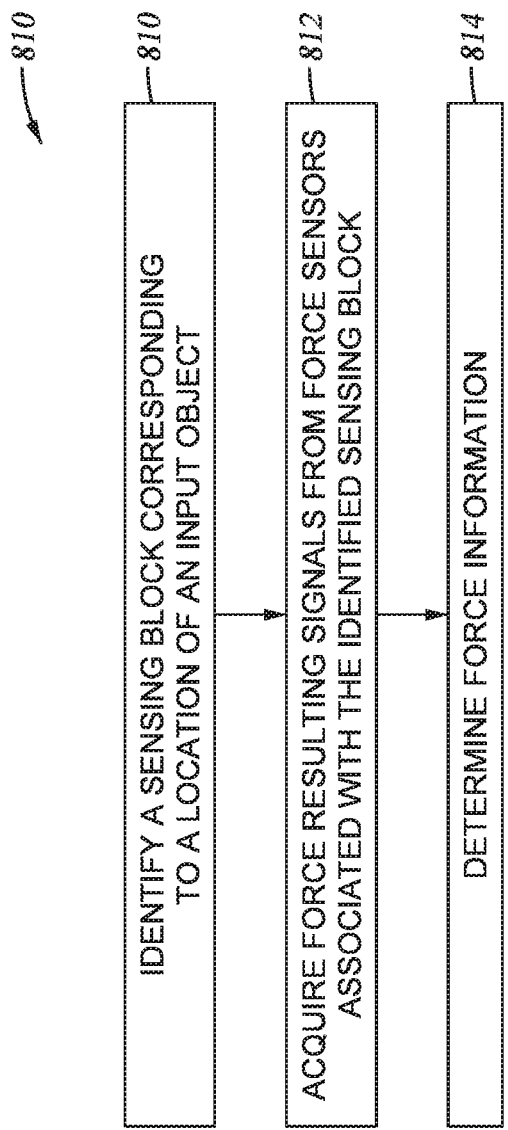
FIG. 8 is a method for operating a force sensing device, according to one or more embodiments.

FIG. 8 is a flowchart illustrating a method 800 for operating a force sensing input device, according to one or more embodiments. FIG. 8 will be described with reference to an input device 900A illustrated in FIG. 9A and the input device 900B illustrated in FIG. 9B. The input device 900A is configured similar to that of the input device 200 of FIG. 2 and the input device 900B is configured similar to that of the input device 500 of FIG. 5. For example, the input device 900A includes force sensors 252-258, the processing system 110, and the active area 970a. Further, the input device 900B includes force sensors 552-558, the processing system 110, and the active area 970B. While not illustrated, the input devices 900A and 900B additionally include the sensor electrodes 160 disposed within a respective one of the active areas 970a and 970B (such as illustrated in FIG. 1A).

The active area 970a is divided into sensing blocks 950. Each sensing block 950 corresponds to sensing nodes of the force sensors 252-258. For example, one or more of the boundaries of each of the sensing blocks 950 is defined by a sensing node 960a-960d of one of the force sensors 252-258. The sensing nodes 960a-960d correspond to the point at which each force sensor 252-258 measures strain. For example, the sensing node 960a of the force sensor 252 and the sensing node 960b of the force sensor 254 extend in the X direction from a center region of the force sensors 252-254. The sensing nodes 960a and 960b correspond to a central point between strain gauges of respective force sensors 252 and 254. The sensing node 960c of the force sensor 256 and the sensing node 960d of the force sensor 258 extend in the Y direction from a center region of the force sensors 256-258. The sensing nodes 960c and 960d correspond to a central point between strain gauges of respective force sensors 256 and 258. Further, a horizontal boundary (e.g., along the X axis) of the sensing blocks 950a, 950b, 950d, 950e, 950g and 950h corresponds to the sensing node 960b of the force sensor 254. A horizontal boundary (e.g., along the X axis) of the sensing blocks 950b, 950c, 950e, 950f, 950g and 950i corresponds to the sensing node 960a of the force sensor 252. Additionally, a vertical boundary (e.g., along the Y axis) of the sensing blocks 950a-950c and 950d-950f corresponds to the sensing node 960C of the force sensor 256. Further, a vertical boundary (e.g., along the Y axis) of the sensing blocks 950d-950f and 950g-950i corresponds to the sensing node 960D of the force sensor 258.

Figure 9A:
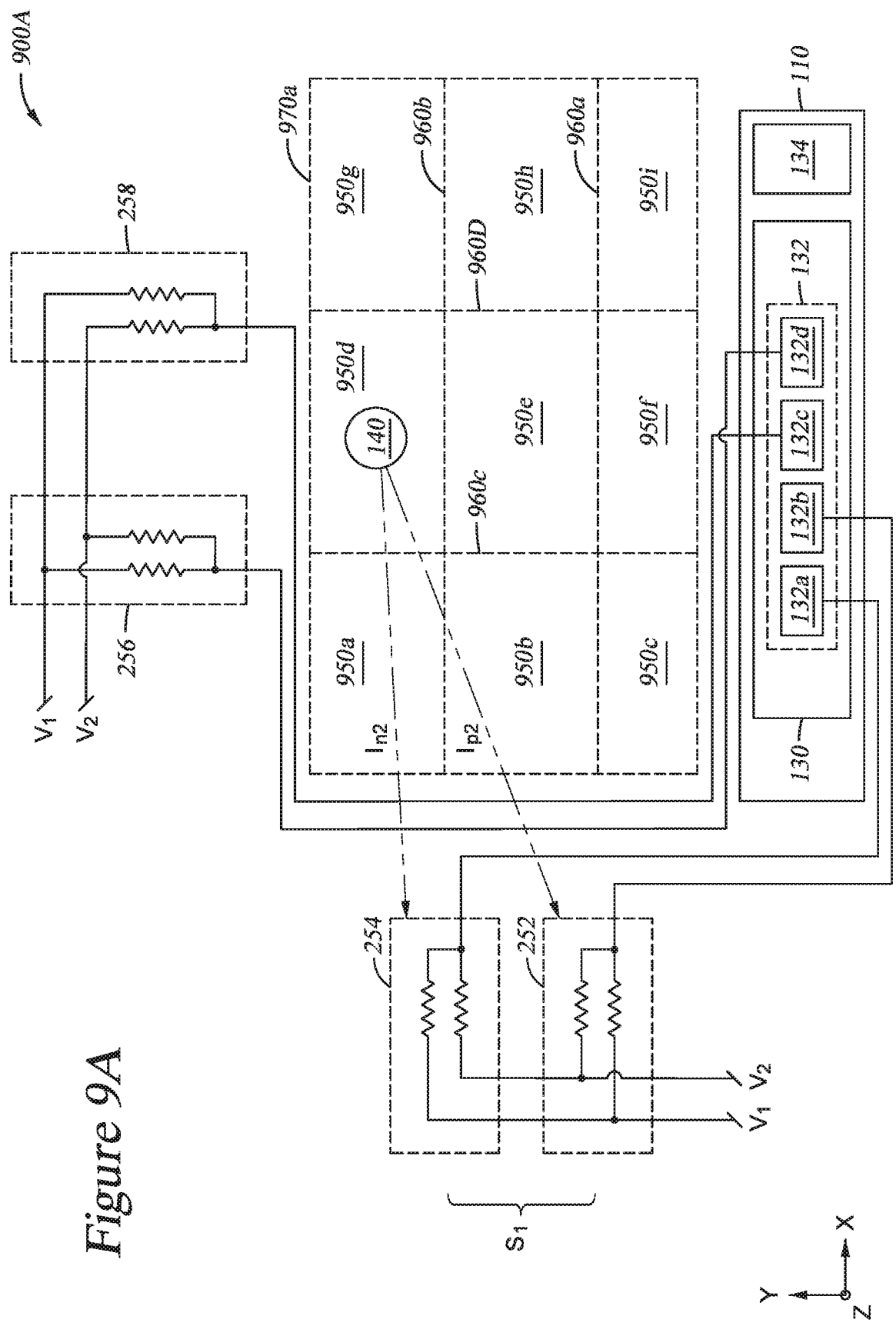
FIG. 9A is a schematic block diagram of an input device, according to one or more embodiments.
Figure 9B:
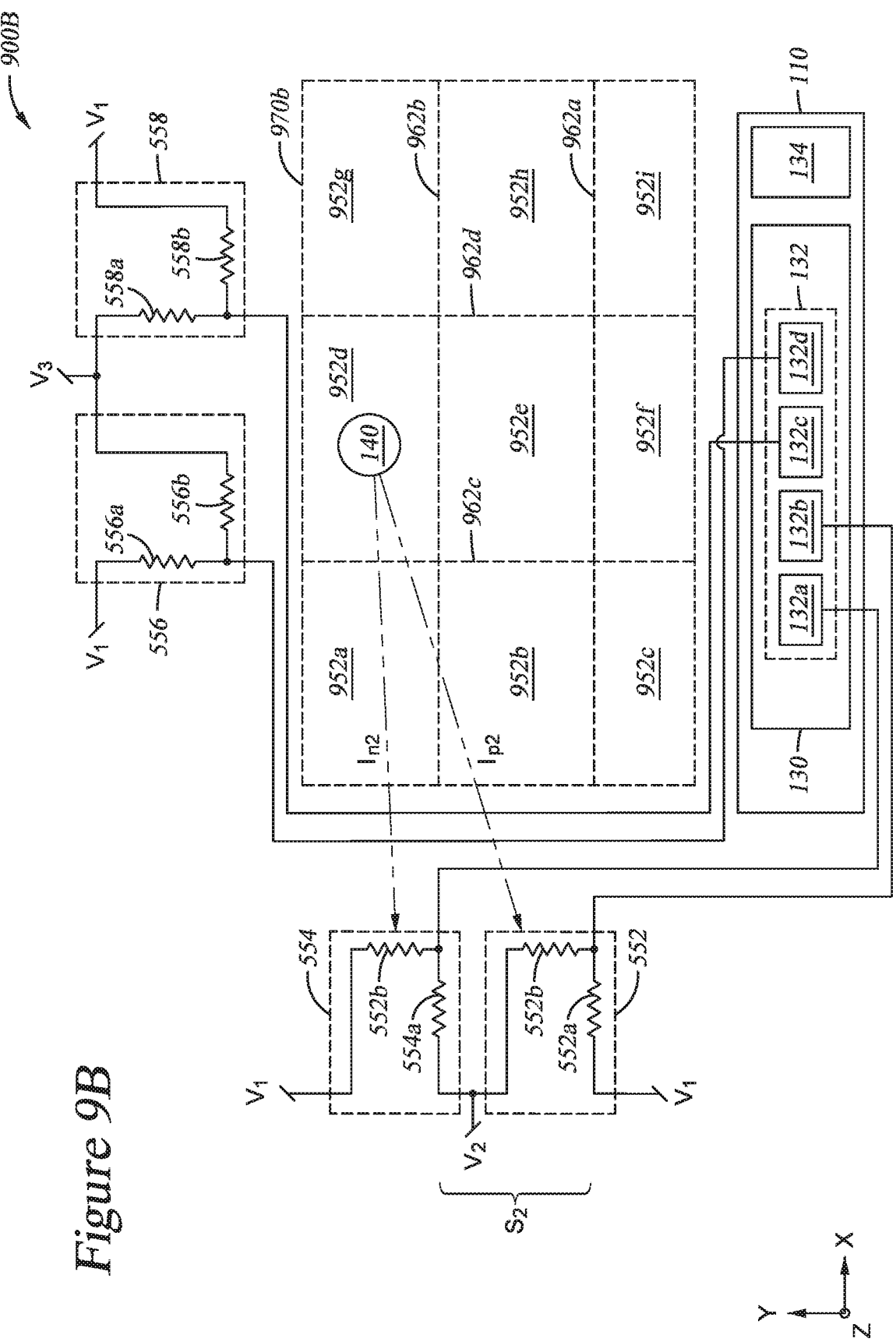
FIG. 9B is a schematic block diagram of an input device, according to one or more embodiments.

With reference to FIG. 9B, the active area 970b is divided into sensing blocks 952. Each sensing block 952 corresponds to sensing nodes of the force sensors 552-558. For example, one or more of the boundaries of each of the sensing blocks 952 is defined by sensing nodes 962a-962d of one of the force sensors 552-558. The sensing nodes 962a-962d correspond to the point at which each force sensor 552-558 measures strain. For example, the sensing node 962a of the force sensor 552 of the force sensor 554 extends in the X direction from a point aligned with the center of the strain gauge 552a. The sensing node 962b of the force sensor 554 extends in the X direction from a point aligned with the center of the strain gauge 554a. Further, the sensing node 962c of the force sensor 556 extends in the Y direction from a point aligned with the center of the strain gauge 556a. Additionally, the sensing node 962D of the force sensor 558 extends in the Y direction from a point aligned with the center of the strain gauge 558a.

A horizontal boundary (e.g., along the X axis) of the sensing blocks 952a, 952b, 952d, 952e, 952g and 952h corresponds to the sensing node 962b of the force sensor 554. A horizontal boundary (e.g., along the X axis) of the sensing blocks 952b, 952c, 952e, 952f, 952g and 952i corresponds to the sensing node 962a of the force sensor 552. Additionally, a vertical boundary (e.g., along the Y axis) of the sensing blocks 952a-952c and 952d-952f corresponds to the sensing node 962c of the force sensor 556. A vertical boundary (e.g., along the Y axis) of the sensing blocks 952d-952f and 952g-952i corresponds to the sensing node 962d of the force sensor 558.

With reference to FIG. 9A, the correspondence between sensing blocks 950 and force sensors 252-258 is determined based on the distance between the sensing blocks 950 and the sensing nodes 960 of a pair of respective force sensors 252-258 of opposite polarities and the distance between the sensing nodes of the force sensors 252-258 of opposite polarities. The distance between the sensing blocks 950 and the sensing nodes may be measured from a center of the sensing blocks 950, a center of a boundary of the sensing blocks 950 or a predetermined position within the sensing blocks 950. In the embodiment of FIG. 9A, the distance $I_{n1}$ between the force sensor 254 and the sensing block 950d and the distance $I_{p1}$ between the force sensor 252 and the sensing block 950d are larger than the distance $S_1$ between sensing nodes 960a and 960b of the force sensors 252 and 254. Accordingly, the force sensors 252 and 254 are utilized to determine force for an input object 140 in the sensing block 950d. In various embodiments, the force sensors 252-258 assigned to each of the sensing blocks 950 are at least one sensing block away from an associated sensing block 950. For example, the sensing block 950d is one sensing block away from the force sensors 252 and 254. Accordingly, the sensing block 950d corresponds to the force sensors 252 and 254.

With reference to FIG. 9B, the correspondence between sensing blocks 952 and force sensors 552-558 is determined based on the distance between a center of the sensing blocks 952 and the sensing nodes 962 of a pair of respective force sensors 552-558 of opposite polarities and the distance between the sensing nodes of the force sensors 552-558 of opposite polarities. In the embodiment of FIG. 9B, the distance $I_{n2}$ between the force sensor 554 and the sensing block 952d and the distance $I_{p2}$ between the force sensor 552 and the sensing block 952d are larger than the distance $S_2$ between sensing nodes 962a and 962b of the force sensors 552 and 554. Accordingly, the force sensors 552 and 554 are utilized to determine force for an input object 140 in the sensing block 952d. In various embodiments, the force sensors 552-558 assigned to each of the sensing blocks 952 are at least one sensing block away from an associated sensing block 952. For example, the sensing block 952d is one sensing block away from the force sensors 552 and 554. Accordingly, the sensing block 952d corresponds to the force sensors 552 and 554.

At operation 810, a sensing block corresponding to a location of an input object (e.g., the input object 140) is identified. In one embodiment, the location of the input object 140 may be determined using one or more capacitive sensing techniques. For example, sensor electrodes (e.g., the sensor electrodes 160) of the active area 970a or 970b may be operated for transcapacitive sensing and/or absolute capacitive sensing by the processing system 110 to determine a location of the input object 140. As illustrated in FIG. 9A, the input object 140 is determined to be located within sensing block 950d by the processing system 110. Accordingly, the force sensors 252 and 254 are selected to be utilized for force sensing. As illustrated in FIG. 9B, the input object 140 is determined to be located within sensing block 952d by the processing system 110. Accordingly, the force sensors 552 and 554 are selected to be utilized for force sensing.

At operation 812, force resulting signals are acquired from force sensors associated with the identified sensing block. For example, one or more receivers (e.g., the receivers 132) acquire force resulting signals from the force sensors 252 and 254 or the force sensors 552 and 554. In various embodiments, the receivers 132 of the sensor driver 130 may process the force resulting signals. For example, the force resulting signals may be passed through an analog-to-digital converter (ADC) of a respective receiver 132 to generate ADC counts representative of each force resulting signal.

At operation 814, force information for the input object is determined. The force resulting signals received from the force sensors 252 and 254 or 552 and 554 may be communicated from the receivers 132 to the determination module 134. Alternatively, the receivers 132 communicate processed versions (e.g., ADC counts) of the force resulting signals to the determination module 134. The determination module 134 may determine force information from the force resulting signals. For example, the force resulting signals may be combined to generate the force information. In one embodiment, the force resulting signals are summed differentially to determine the force information. In one embodiment, the receivers 132 communicate unprocessed versions of force resulting signals to the determination module 134.

In various embodiments, the determination module 134 may remove a baseline from the force resulting signals. Further, the determination module 134 may determine a force value indicative of a magnitude of force and/or a change in force measurement for each force sensor 252 and 254 or 552 and 554 from the corresponding force resulting signals. Additionally, the determination module 134 compares the force measurement to one or more force thresholds to determine if the force applied by the input object 140 satisfies the force thresholds. For example, in one embodiment, a single force threshold may be used and the force measurements may be compared to force threshold to determine a binary response indicating if force was applied, e.g., the force values were greater than the force threshold, or if no force was applied, e.g., force values were less than the force threshold. Alternatively, more than one force threshold may be used and an indication as to whether the force measurements satisfied each force threshold may be generated. In various embodiments, each sensing block 950 or 952 is associated with a transfer function and the transfer function may be utilized to further adjust the force measurement by applying a weighting factor. The transfer function for each sensing block 950 or 952 may be pre-determined. For example, the transfer function may be determined by applying a known weight at different locations of the active area 970a and 970b and recording the corresponding force measurements from each force sensor 252, 254, 256, and 258 or 552, 554, 556, and 558.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A force sensing device comprising:
 a first force sensor configured to output a first force resulting signal and comprising:
  a first strain gauge having a first end coupled to a first voltage source configured to provide a first voltage and a second end coupled to a first trace; and
  a second strain gauge having a first end coupled to a second voltage source configured to provide a second voltage and a second end coupled to the first trace, wherein the second voltage differs from the first voltage; and
 a second force sensor configured to output a second force resulting signal and comprising:
  a first strain gauge having a first end coupled to the second voltage source and a second end coupled to a second trace; and
  a second strain gauge having a first end coupled to the first voltage source and a second end coupled to the second trace;
 wherein the first force resulting signal and the second force resulting signal are voltage signals having opposite polarities.

2. The force sensing device of claim 1, wherein one of the first strain gauge or the second strain gauge of the first force sensor is an n-type strain gauge, and the other one is a p-type strain gauge.

3. The force sensing device of claim 2, wherein one of the first strain gauge or the second strain gauge of the second force sensor is an n-type strain gauge, and the other one is a p-type strain gauge.

4. The force sensing device of claim 1, wherein the first strain gauge of the first force sensor is disposed electrically parallel to the second strain gauge of the first force sensor, and wherein the first strain gauge of the second force sensor is disposed electrically parallel to the second strain gauge of the second force sensor.

5. The force sensing device of claim 1, wherein the second strain gauge of the first force sensor is disposed adjacent to the first strain gauge of the second force sensor, and the second strain gauge of the first force sensor is disposed between the first strain gauge of the first force sensor and the first strain gauge of the second force sensor.

6. The force sensing device of claim 1, further comprising:
 a third force sensor configured to output a third force resulting signal and comprising:
  a first strain gauge having a first end coupled to the first voltage source or a second end coupled to a third trace; and
  a second strain gauge having: a first end coupled to one of the second voltage source and a third voltage source configured to provide a third voltage, and a second end coupled to the third trace; and
 a fourth force sensor configured to output a fourth force resulting signal and comprising:
  a first strain gauge having: a first end coupled to the one of the second voltage or the third voltage source, and a second end coupled to a fourth trace; and
  a second strain gauge having a first end coupled to the first voltage and a second end coupled to the fourth trace;
 wherein the third force resulting signal and the fourth force resulting signal are voltage signals having opposite polarities.

7. The force sensing device of claim 1, wherein the first strain gauge and the second strain gauge of the first force sensor are matching, and the first strain gauge and the second strain gauge of the second force sensor are matching.

8. The force sensing device of claim 1, wherein the first strain gauge of the first force sensor is disposed perpendicular to the second strain gauge of the first force sensor, and wherein the first strain gauge of the second force sensor is disposed perpendicular to the second strain gauge of the second force sensor.

9. The force sensing device of claim 1, wherein the first force sensor further comprises:
 a third strain gauge having a first end coupled to the first voltage source and a second end coupled to the first trace; and
 a fourth strain gauge having a first end coupled to the second voltage source and a second end coupled to the first trace.

10. The force sensing device of claim 1, wherein the first force sensor further comprises:
 a third strain gauge having a first end coupled to the second end of the first strain gauge of the first force sensor; and
 a fourth strain gauge having a first end coupled to the second end of the second strain gauge of the first force sensor.

11. The force sensing device of claim 1, further comprising:
 a plurality of sensor electrodes defining an active area;
 wherein the first force sensor and the second force sensor are disposed between the active area and a first edge of the force sensing device.

12. The force sensing device of claim 11, wherein the active area comprises a first sensing block and a second sensing block;
 wherein a boundary of the first sensing block corresponds to a sensing node of the first force sensor, and a boundary of the second sensing block corresponds to a sensing node of the second force sensor.

13. A system comprising:
 a sensor driver;
 a first force sensor;
 a second force sensor; and
 a processing system;
 wherein the sensor driver is coupled to the first force sensor and the second force sensor via a first trace and a second trace, respectively, and wherein the sensor driver is configured to receive a first force resulting signal from the first force sensor and a second force resulting signal from the second force sensor, wherein the first force resulting signal and the second force resulting signal are voltage signals having opposite polarities;
 wherein the first force sensor comprises:
  a first strain gauge having a first end coupled to a first voltage source configured to provide a first voltage and a second end coupled to the first trace; and a second strain gauge having a first end coupled to a second voltage source configured to provide a second voltage and a second end coupled to the first trace, wherein the first voltage differs from the second voltage;

wherein the second force sensor comprises:
a first strain gauge having a first end coupled to the second voltage source and a second end coupled to the second trace; and
a second strain gauge having a first end coupled to the first voltage source and a second end coupled to the second trace; and wherein the processing system is configured to determine force information for an input object based on the first and second force resulting signals.

14. The system of claim 13, wherein one of the first strain gauge or the second strain gauge of the first force sensor is an n-type strain gauge, and the other one is a p-type strain gauge.

15. The system of claim 13, wherein the first strain gauge of the first force sensor is disposed electrically parallel to the second strain gauge of the first force sensor, and wherein the first strain gauge of the second force sensor is disposed electrically parallel to the second strain gauge of the second force sensor.

16. The system of claim 13, wherein the first strain gauge of the first force sensor matches the second strain gauge of the first force sensor, and the first strain gauge of the second force sensor matches the second strain gauge of the second force sensor.

17. The system of claim 13, wherein the first strain gauge of the first force sensor is disposed perpendicular to the second strain gauge of the first force sensor, and wherein the first strain gauge of the second force sensor is disposed perpendicular to the second strain gauge of the second force sensor.

18. An input device comprising:
an active area defined by a plurality of sensor electrodes;
a first force sensor disposed between a first edge of the input device and the active area, wherein the first force sensor comprises:
a first strain gauge having a first end coupled to a first voltage source configured to provide a first voltage and a second end coupled to a first trace; and
a second strain gauge having a first end coupled to a second voltage source configured to provide a second voltage and a second end coupled to the first trace, wherein the second voltage differs from the first voltage;
a second force sensor disposed between the first edge of the input device and the active area, wherein the second force sensor comprises:
a first strain gauge having a first end coupled to the second voltage source and a second end coupled to a second trace; and
a second strain gauge having a first end coupled to the first voltage source and a second end coupled to the second trace; and
a processing system coupled to the first force sensor and the second force sensor via the first trace and the second trace, respectively, wherein the processing system is configured to:
receive a first force resulting signal from the first force sensor and a second force resulting signal from the second force sensor, wherein the first force resulting signal and the second force resulting signal are voltage signals having opposite polarities; and
determine force information for an input object based at least in part on the first force resulting signal and the second force resulting signal.

19. The input device of claim 18, wherein one of the first strain gauge or the second strain gauge of the first force sensor is an n-type strain gauge, and the other one is a p-type strain gauge; and
wherein the first strain gauge of the first force sensor is disposed electrically parallel to the second strain gauge of the first force sensor.

20. The input device of claim 18, wherein the first strain gauge and the second strain gauge of the first force sensor are matching, and wherein the first strain gauge of the first force sensor is disposed perpendicular to the second strain gauge of the first force sensor.

* * * * *